(12) United States Patent
Lin et al.

(10) Patent No.: US 12,241,519 B2
(45) Date of Patent: Mar. 4, 2025

(54) TUNED MASS DAMPING DEVICE

(71) Applicant: ZHUZHOU TIMES NEW MATERIAL TECHNOLOGY CO., LTD, Hunan (CN)

(72) Inventors: Sheng Lin, Hunan (CN); Weihui Hu, Hunan (CN); Tao Yue, Hunan (CN); Pengfei Yuan, Hunan (CN); Chao Yang, Hunan (CN); Zetao Su, Hunan (CN); Zhan Pan, Hunan (CN); Zhongzheng Qin, Hunan (CN); Congcong Chen, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 486 days.

(21) Appl. No.: 17/753,858

(22) PCT Filed: Sep. 17, 2020

(86) PCT No.: PCT/CN2020/115954
§ 371 (c)(1),
(2) Date: Mar. 16, 2022

(87) PCT Pub. No.: WO2021/052427
PCT Pub. Date: Mar. 25, 2021

(65) Prior Publication Data
US 2022/0333661 A1    Oct. 20, 2022

(30) Foreign Application Priority Data

Sep. 20, 2019   (CN) .......................... 201910891522.8
Sep. 20, 2019   (CN) .......................... 201910891779.3

(51) Int. Cl.
*F16F 7/104*    (2006.01)
*F03D 13/20*    (2016.01)

(52) U.S. Cl.
CPC .............. *F16F 7/104* (2013.01); *F03D 13/20* (2016.05); *F05B 2260/964* (2013.01); *F16F 2222/08* (2013.01)

(58) Field of Classification Search
CPC .......... F16F 7/104; F16F 13/20; F16F 7/1028; F16F 1/393; F16F 7/116; F16F 2222/08;
(Continued)

(56) References Cited

U.S. PATENT DOCUMENTS

| | | | |
|---|---|---|---|
| 8,418,413 B2 * | 4/2013 | Marmo | .................. E02D 27/42 |
| | | | 52/651.01 |
| 10,024,378 B2 * | 7/2018 | Könitz | .................... F03D 80/88 |
| 11,746,749 B2 * | 9/2023 | Li | ......................... F03D 7/0296 |
| | | | 188/379 |

FOREIGN PATENT DOCUMENTS

| | | |
|---|---|---|
| CN | 101852188 A | 10/2010 |
| CN | 202783720 U | 3/2013 |

(Continued)

OTHER PUBLICATIONS

Search Report from corresponding Chinese Application No. 2019108917793, Jul. 10, 2020.
(Continued)

*Primary Examiner* — Pamela Rodriguez
(74) *Attorney, Agent, or Firm* — Workman Nydegger

(57) ABSTRACT

A tunable mass damping device, including a connecting, a weighted assembly, and a top connecting assembly connecting an upper end of the connecting rod with a tower beam of a tower and including an anti-rotation mechanism. The anti-rotation mechanism includes: a laterally extending fixing plate fixedly connected with the tower beam through a longitudinally extending supporting member; a laterally extending first movable plate arranged under the fixing plate and fixedly connected with the upper end of the connecting rod; and two connecting shafts spaced apart from each other.

(Continued)

Each of the connecting shafts has a lower end fixedly connected to the first movable plate, and an upper end inserted into the fixing plate and connected therewith through a connecting head. The connecting head includes an intermediate elastic layer arranged between inner and outer sleeves of the connecting head.

20 Claims, 23 Drawing Sheets

(58) Field of Classification Search
CPC ....... F03D 13/20; Y02E 10/17; Y02E 10/727; Y02E 10/728; F05B 2260/964
See application file for complete search history.

(56) References Cited

FOREIGN PATENT DOCUMENTS

| | | |
|---|---|---|
| CN | 103306394 A | 9/2013 |
| CN | 105756219 A | 7/2016 |
| CN | 106703246 A | 5/2017 |
| CN | 106939653 A | 7/2017 |
| CN | 107620675 A | 1/2018 |
| CN | 207315575 U | 5/2018 |
| CN | 108443396 A | 8/2018 |
| CN | 207974602 U | 10/2018 |
| CN | 209483859 * | 10/2019 |
| CN | 110805529 A | 2/2020 |
| CN | 110805530 A | 2/2020 |
| CN | 112555104 * | 3/2021 |
| EP | 1008747 A2 | 6/2000 |
| EP | 2746483 A1 | 6/2014 |
| EP | 3462053 * | 4/2019 |
| JP | 2011069104 A | 4/2011 |
| JP | 2015175100 A | 10/2015 |
| KR | 101066589 B1 | 9/2011 |
| KR | 20140037617 A | 3/2014 |

OTHER PUBLICATIONS

Search Report from corresponding Chinese Application No. 2019108915228, Jul. 10, 2020.
International Search Report and Written Opinion from PCT Application No. PCT/CN2020/115954, Dec. 16, 2020.

* cited by examiner

TUNED MASS DAMPING DEVICE

TECHNICAL FIELD

The present invention relates to the technical field of vibration reduction of wind generators, in particular to a tunable mass damping device.

TECHNICAL BACKGROUND

Wind power is a kind of clean energy, and has received extensive attention in recent years. In order to improve the efficiency of power generation, high-tower wind turbines installed at wind sites with medium or low wind speed and offshore wind sites have gradually become an important competition direction for wind turbine manufacturers. The increase in the height of the tower can effectively improve the efficiency of power generation, but at the same time, will cause the tower to easily vibrate, or even oscillate to a large extent. Such vibrations and oscillations per se will negatively influence on the structural stability of the generator. In addition, the rotational speed of the turbine may run across the first order frequency of the tower. When the rotational speed runs across the tower frequency, resonance will be generated, thus bringing about very serious safety hazards.

Conventionally, lateral oscillation of the tower can be attenuated by hanging sandbags in the cylinder of the tower. This approach involves low cost and is easy to implement. However, in use the sandbags are prone to be self-rotary. In this case, the movement trajectories of the sandbags are very complicated and difficult to predict, so that the sandbags can barely achieve the function of attenuating the oscillation of the tower as expected. In some cases, the sandbags may even exacerbate the oscillation of the tower.

Therefore, there is a need for a device that can effectively attenuate the oscillation of the tower of a wind turbine.

SUMMARY OF THE INVENTION

In view of the above problems, the present invention proposes a tunable mass damping device, which can effectively attenuate the oscillation of the tower of a wind turbine.

The tunable mass damping device according to the present invention comprises: a connecting rod extending in a longitudinal direction; a weighted assembly connected at a lower end of the connecting rod; and a top connecting assembly, which is connected between an upper end of the connecting rod and a tower beam of a tower, and includes an anti-rotation mechanism. The anti-rotation mechanism comprises: a laterally extending fixing plate, which is fixedly connected to the tower beam through a longitudinally extending support member; a laterally extending first movable plate, which is arranged under the fixing plate and fixedly connected with the upper end of the connecting rod; and two connecting shafts spaced apart from each other, wherein each of said connecting shafts extends in the longitudinal direction, and has a lower end fixedly connected to the first movable plate, and an upper end inserted into the fixing plate and connected therewith through a connecting head. The connecting head includes an outer sleeve connected to the fixing plate, an inner sleeve arranged in the outer sleeve and connected to a respective one of the connecting shafts, and an intermediate elastic layer arranged between the inner sleeve and the outer sleeve.

The connecting head, which has a structure consisting of an outer sleeve, an intermediate elastic layer and an inner sleeve in sequence from the outside to the inside, has large radial stiffness (lateral stiffness) on the one hand, and small deflection stiffness on the other hand. In this manner, the connecting head allows the connecting shafts, the first movable plate and the connecting rod and the weighted assembly to swing relative to the fixing plate and the tower, thereby attenuating the oscillation of the tower itself. At the same time, when the weighted assembly, the connecting rod and the first movable plate are inclined to rotate, the connecting shafts and the connecting head can cooperate with the fixing plate to eliminate the tendency of rotation. Accordingly, self-rotation of the tunable mass damping device can be effectively avoided, and thus the oscillation of the device can be performed as intended. In this case, the oscillation of the tower can be effectively weakened, thereby ensuring the structural stability of the wind turbine. In particular, resonance between the tower oscillation and the turbine rotation can be avoided, thus effectively eliminating potential safety hazards.

In one embodiment, an inner side surface of the outer sleeve and/or an outer side surface of the inner sleeve is configured as an arched surface, which has a central part protruding outward in a radial direction.

In one embodiment, the top connecting assembly further comprises an outer mounting sleeve, through which the connecting head is connected with the fixing plate. The outer mounting sleeve is configured to arrange around the outer sleeve and pressing inward thereon, so as to pre-compress the intermediate elastic layer of the connecting head. As an addition or alternative, the top connecting assembly further comprises an inner mounting sleeve, through which the connecting head is connected with a respective one of the connecting shafts. The inner mounting sleeve is configured to arrange within the inner sleeve and press outward thereon, so as to pre-compress the intermediate elastic layer of the connecting head.

In one embodiment, the lower end of each connecting shaft is configured as an expansion cone, which is inserted into the first movable plate from a first side of the first movable plate and fixedly connected therewith through a first screw located at a second side of the first movable plate, wherein a pressing plate configured to cover the expansion cone is fixedly connected on the first side of the first movable plate.

In one embodiment, a gap is formed between the connecting shaft and the inner sleeve of the connecting head, or a linear bearing or a wear-resistant material body is provided so that the connecting shaft is slidable in an axial direction relative to the inner sleeve of the connecting head.

In one embodiment, the top connecting assembly comprises a longitudinal bearing mechanism. The longitudinal bearing mechanism comprises: a fixed connecting unit, which includes the fixing plate and a lower ball seat arranged on the fixing plate, the lower ball seat being configured with a convexly arcuate fixed mating surface facing upward; a movable connecting unit, which includes a second movable plate arranged above the fixed connecting unit and spaced therefrom, and an upper ball seat arranged below the second movable plate, the upper ball seat being configured with a concavely arcuate movable mating surface facing downward, and the second movable plate being fixedly connected to the first movable plate through a longitudinally extending auxiliary connecting element; and an elastic connecting member, which is arranged between the fixed mating surface and the movable mating surface, and has a shape matching with the fixed mating surface and the movable mating surface.

In one embodiment, the arcuate fixed mating surface has a planar portion extending in a lateral direction at a central part thereof, and/or the arcuate movable mating surface has a planar portion extending in the lateral direction at a central part thereof.

In one embodiment, a second concave portion is provided at an edge of the elastic connecting member, and configured to be able to at least partially close up when being loaded in the longitudinal direction.

In one embodiment, a metal spacing plate is embedded in the elastic connecting member, wherein the metal spacing plate extends throughout the elastic connecting member, or is only arranged at an edge of the elastic connecting member but not extending to a center of the elastic connecting member.

In one embodiment, the top connecting assembly comprises a longitudinal bearing mechanism. The longitudinal bearing mechanism comprises: a fixed connecting unit, which includes the fixing plate and a bearing seat arranged on the fixing plate, the bearing seat being configured with a concavely arcuate first bearing engagement surface facing upward; and a movable connecting unit, which includes a second movable plate arranged above the fixed connecting unit, and a bearing slider arranged below the second movable plate, the bearing slider being configured with a convexly arcuate second bearing engagement surface facing downward, wherein the second bearing engagement surface and the first bearing engagement surface are in contact with each other, so that the bearing slider is slidable along the first bearing engagement surface of the bearing seat.

In one embodiment, one or more wear-resistant sheets are provided on the first bearing engagement surface.

In one embodiment, the bearing slider is further configured with a concavely arcuate third bearing engagement surface facing upward. The longitudinal bearing mechanism further includes a limiting plate arranged on the bearing slider, the limiting plate being configured with a convexly arcuate fourth bearing engagement surface facing downward, which is in contact with the third bearing engagement surface, so that the bearing slider is slidable along the fourth bearing engagement surface of the limiting plate. Each of the first bearing engagement surface and the bearing slider is configured as having an annular shape, and the bearing seat is further provided with a connecting protrusion, which extends upward from a middle part of the annular first bearing engagement surface and passes through the bearing slider to fixedly connect with the limiting plate, wherein an inner diameter of the annular bearing slider is larger than an outer diameter of the connecting protrusion, and a sliding range of the bearing slider is restricted by the inner diameter of the bearing slider and the outer diameter of the connecting protrusion.

In one embodiment, the bearing seat is provided with lubricant passages extending from an outer surface of the bearing seat to the first bearing engagement surface, for supplying lubricant to the first bearing engagement surface and the second bearing engagement surface.

In one embodiment, the connecting rod comprises: a connecting core shaft, which is connected between the top connecting assembly and the weighted assembly, and configured to be elongated for reducing its weight; and an outer casing, which extends in the longitudinal direction to be sandwiched between the top connecting assembly and the weighted assembly, and encloses the connecting core shaft.

In one embodiment, the weighted assembly comprises one weighting unit, under which a colliding mechanism is provided. The colliding mechanism is configured to correspond to a colliding counterpart arranged in the tower, so that they are able to collide with each other In one embodiment, the weighted assembly comprises at least two weighting units spaced apart from each other in the longitudinal direction, and a colliding mechanism provided between two adjacent ones of said at least two weighting units. The colliding mechanism is configured to correspond to a colliding counterpart arranged in the tower so that they are able to collide with each other, said at least two weighting units being configured to adjust a center of gravity of the tunable mass damping device to the colliding mechanism.

In one embodiment, the colliding mechanism comprises: a colliding body arranged in the colliding counterpart, which is annular; and an elastic buffering member, which is connected between the colliding body and a respective weighting unit located above the colliding body.

In one embodiment, the elastic buffering member is configured as an elastic column extending in the longitudinal direction.

In one embodiment, an elastic pad is provided between the colliding body and the colliding counterpart, and made of metal or polymer material softer than the colliding body.

In one embodiment, each weighting unit comprises a tray extending in a lateral direction, and one or more weighting plates arranged on the tray in a stack.

In one embodiment, the tunable mass damping device further comprises a bottom spring assembly arranged under the weighted assembly, the bottom spring assembly including a bottom elastic member extending in the longitudinal direction and connected between a bottom wall of the tower and the weighted assembly.

In one embodiment, the bottom spring assembly further comprises: a first link extending downward in the longitudinal direction from the weighted assembly; and a second link extending in the longitudinal direction, wherein an upper end of the second link is hinged with the first link, and a lower end thereof is connected with the bottom elastic member.

In one embodiment, the bottom spring assembly further comprises a third link connected between the bottom elastic member and the bottom wall of the tower, the third link being hinged with the bottom wall of the tower.

In one embodiment, the tunable mass damping device further includes a damper connected between the first link and a side wall of the tower. The damper extends in the lateral direction, and has two ends respectively hinged with the first link and the tower.

In one embodiment, both ends of the damper are hinged with the first link and the side wall of the tower, respectively.

In one embodiment, two dampers are spaced apart from each other in the lateral direction with an angle of 90°.

In one embodiment, the damper is inclined in the longitudinal direction, and both ends of the damper are hinged with the first link and the bottom wall of the tower, respectively.

In one embodiment, the connecting rod comprises: a connecting core shaft, which is connected between the top connecting assembly and the weighted assembly, and configured to be elongated for reducing its weight; and an outer casing, which extends in the longitudinal direction to be sandwiched between the top connecting assembly and the weighted assembly, and encloses the connecting core shaft.

Compared with the prior arts, the present invention has the advantages that the self-rotation of the tunable mass damping device can be effectively avoided, thus attenuating the oscillation of the tower more effectively. In addition, when the device swings exceeding a certain range, the colliding mechanism will collide with the colliding counterpart to dissipate oscillation energy of the device, and at the same time, the device will be forced to swing in the opposite direction.

BRIEF DESCRIPTION OF THE DRAWINGS

The present invention will be described in more detail below with reference to the accompanying drawings. In the drawings.

In the drawings, the same components are indicated with the same reference numbers. The drawings are not drawn to actual scale.

DETAILED DESCRIPTION OF THE EMBODIMENTS

The present invention will be further described below in conjunction with the accompanying drawings.

Figure 1:
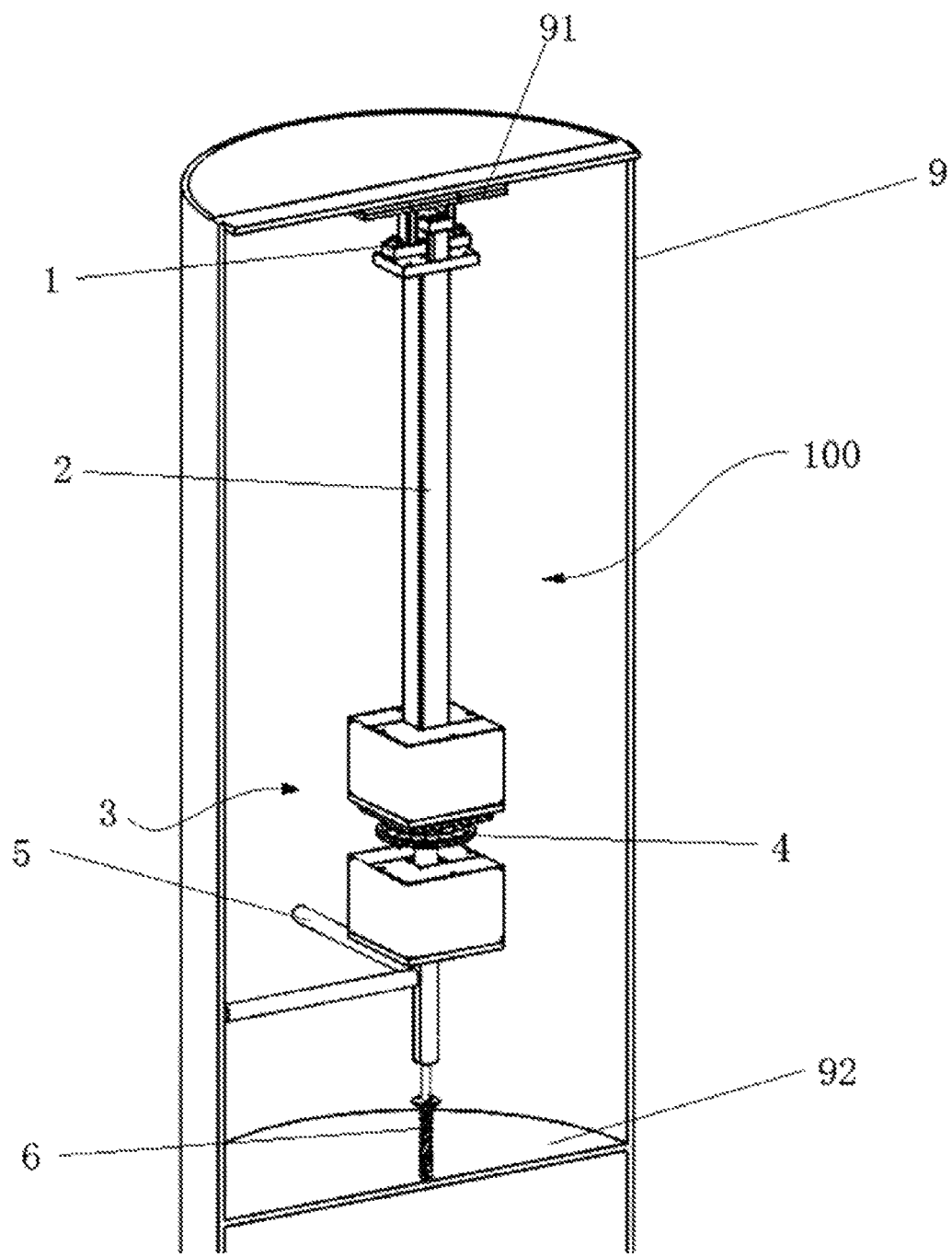
FIG. 1 shows an exemplary embodiment of a tunable mass damping device according to the present invention.

FIG. 1 shows an embodiment of a tunable mass damping device 100 (hereinafter referred to as "device" for short) according to the present invention. The device 100 is arranged in a tower 9 of a wind power generator, and includes, along a direction from top to bottom, a top connecting assembly 1, a connecting rod 2, a weighted assembly 3, and a bottom spring assembly 6, wherein the top connecting assembly 1 is connected to a tower beam 91 arranged at the top of the tower 9, while the bottom spring assembly 6 is connected to a bottom wall 92 of the tower 9. In addition, a colliding mechanism 4 may also be provided adjacent to the weighted assembly 3. A damper connected to a side wall of the tower 9 is further provided at the bottom spring assembly 6.

The structure of the device 100 will be described in more detail below with reference to FIGS. 2-25.

Figure 2:
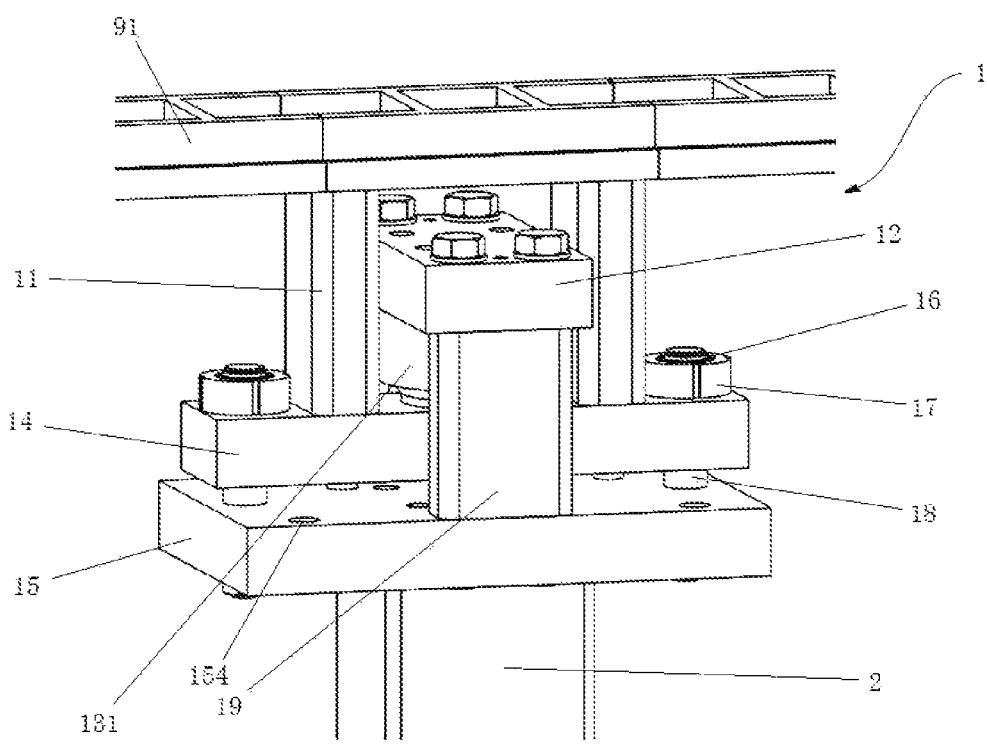
FIG. 2 is a partial enlarged view of a top connecting assembly of the device of FIG. 1.
Figure 3:
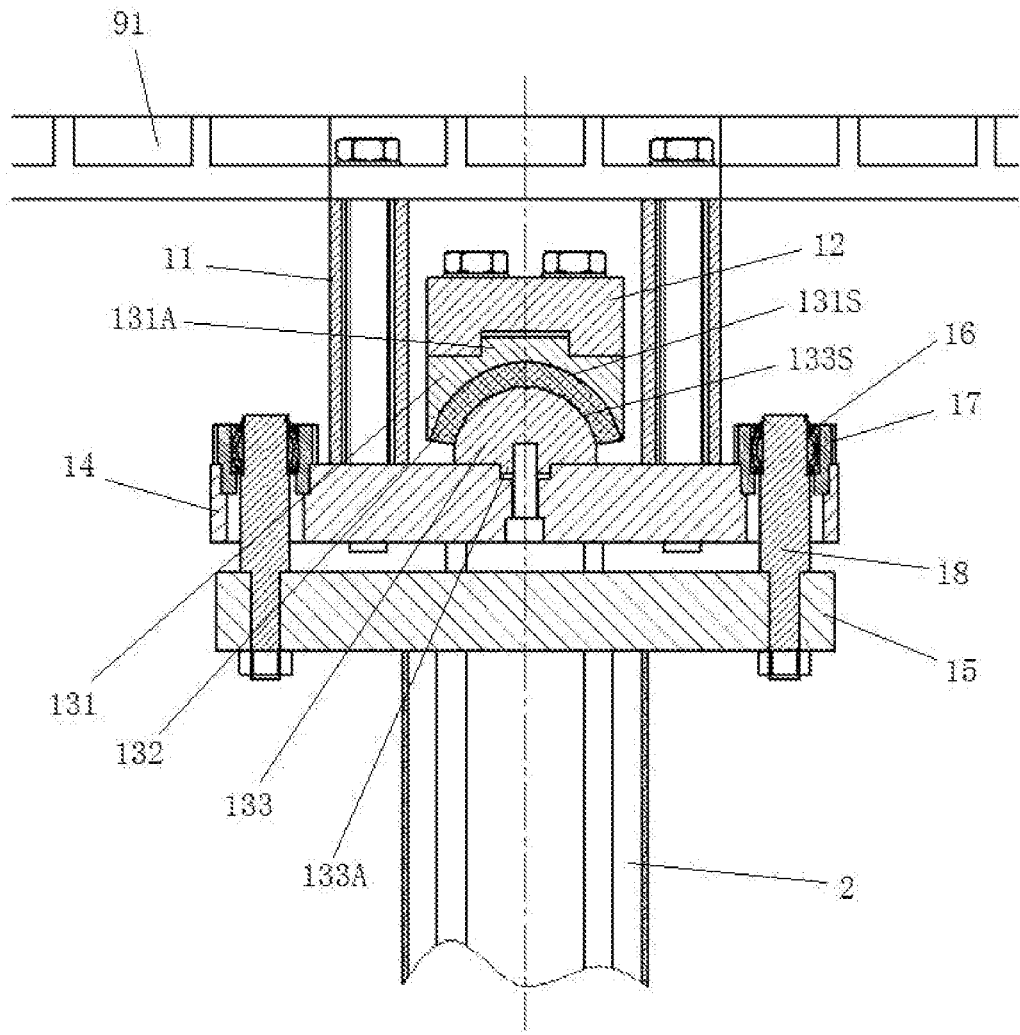
FIG. 3 is a cross-sectional view of the top connecting assembly of FIG. 2.

As shown in FIGS. 2 and 3, the top connecting assembly 1 includes a fixing plate 14 extending along a lateral direction. The fixing plate 14 is arranged below the tower beam 91 and substantially parallel thereto. A supporting tube 11 is provided between the tower beam 91 and the fixing plate 14. Bolts pass through the tower beam 91, the supporting tube 11 and the fixing plate 14 to secure them together.

The top connecting assembly 1 further includes a first movable plate 15 extending along the lateral direction and located under the fixing plate 14. A connecting shaft 18 extending along a longitudinal direction passes through the fixing plate 14 and the first movable plate 15 to connect the fixing plate 14 and the first movable plate 15 together, wherein one end of the connecting shaft 18 is fixedly connected with the first movable plate 15, and the other end thereof is connected with the fixing plate 14 through a connecting head 16. The first movable plate 15 may be fixedly connected with the connecting rod 2 which is located above the first movable plate 15.

In addition, the top connecting assembly 1 further includes a lower ball seat 133 disposed on the fixing plate 14. The lower ball seat 133 protrudes upwardly relative to the fixing plate 14 to form a fixed mating surface of arc-shape, on which an elastic connecting member 132 is provided. An upper ball seat 131 is arranged on the elastic connecting member 132, and configured with a downwardly concave lower surface, which is also arc-shaped. In this manner, the upper ball seat 131 and the lower ball seat 133 are spaced apart from each other in the longitudinal direction, with the elastic connecting member 132 connected therebetween. The elastic connecting member 132, the lower ball seat 133 and the upper ball seat 131 may be fixedly connected together, for example, through vulcanization, to form into one piece. A second movable plate 12 may be further provided on the upper ball seat 131. The second movable plate is fixedly connected with the first movable plate 15 through an auxiliary connecting element 19, which extends across the fixing plate 14 along the longitudinal direction. Therefore, the weight of the weighted assembly 3 can be transmitted to the upper ball seat 131 through the connecting rod 2, the first movable plate 15, the auxiliary connecting element 19 and the second movable plate 12, thereby compressing the elastic connecting member 132 downward. This arrangement enables the elastic connecting member 132 to have greater longitudinal stiffness and higher longitudinal bearing capacity. At the same time, the elastic connecting member 132 has lower deflection stiffness (i.e., the stiffness around the center of the arc shape), which allows the upper ball seat 131 to rotate relative to the lower ball seat 133. In this manner, it is possible for the connecting rod 2 and the weighted assembly 3 both fixed to the upper ball seat 131 to swing relative to the tower 9 fixed to the lower ball seat 133.

Viewed from another perspective, the fixing plate 14, the tower beam 91 and the supporting tube 11 as mentioned above are connected together through bolts to form a substantially "□"-shaped annular structure. In the meantime, the second movable plate 12, the auxiliary connecting element 19 and the first movable plate 15 are connected together through bolts to form another substantially "□"-shaped annular structure. Such two annular structures are nested one with another, and connected together through the upper ball seat 131, the lower ball seat 133 and the elastic connecting member 132, so as to realize a bearing effect in the longitudinal direction.

In one embodiment, as shown in FIG. 3, a lower surface (i.e., a movable mating surface) 131S of the upper ball seat 131 and an upper surface (i.e., the fixed mating surface) 133S of the lower ball seat 133 are both configured as part of a spherical surface and have the same center of circle. Thus, the elastic connecting member arranged between the upper ball seat 131 and the lower ball seat 133 has a uniform thickness. This structure is easy for processing, and at the same time can provide good longitudinal bearing capacity and shearing deformation capacity.

In another embodiment, the lower surface of the upper ball seat 131 and the upper surface of the lower ball seat 133 both are configured as part of a spherical surface but have different radii, wherein the radius of the lower surface of the upper ball seat 131 is relatively small while that of the upper surface of the lower ball seat 133 is relatively large. Thus, the elastic connecting member arranged between the upper ball seat 131 and the lower ball seat 133 is relatively thick in a middle part thereof but relatively thin in a peripheral part thereof. With this arrangement, it is beneficial to reduce the rubber stress generated in the middle part, so that the elastic connecting member 132 would not be inclined to fatigue, and have a higher longitudinal (vertical) bearing capacity.

Figure 5:
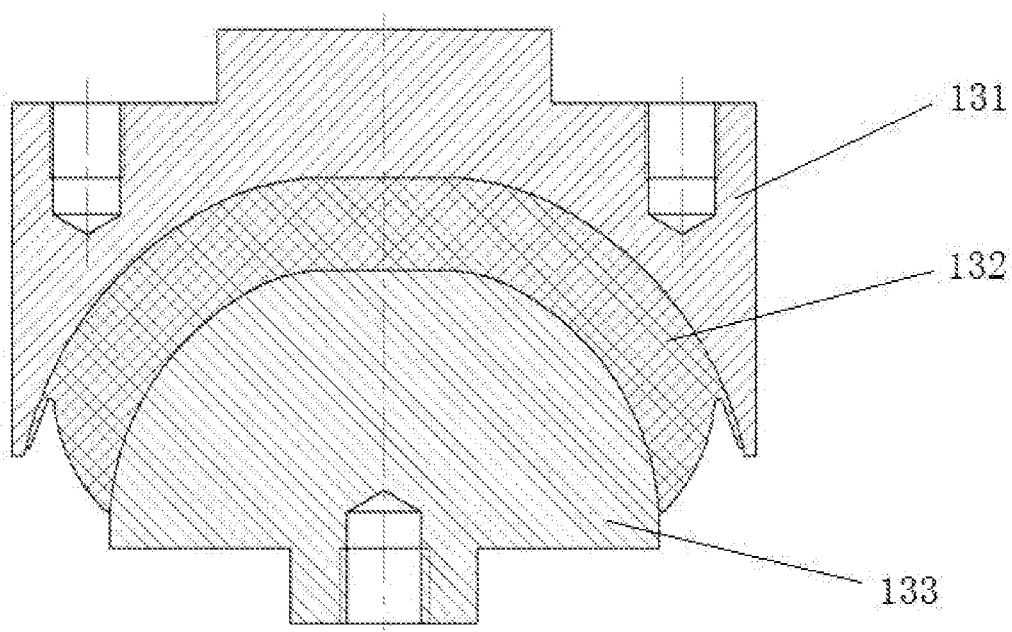
FIG. 5 is a partial enlarged view of the top connecting assembly in a preferred embodiment.
Figure 6:
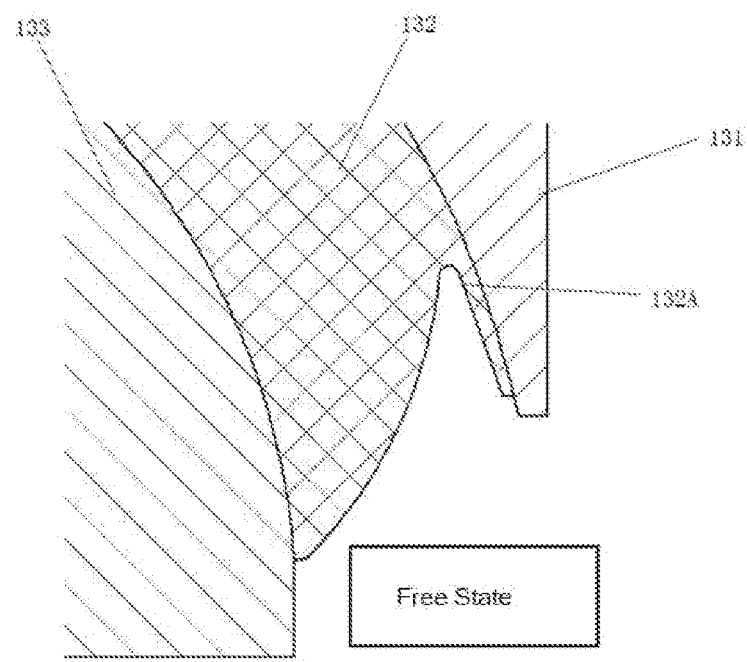
FIGS. 6 and 7 respectively show the structure of the top connecting assembly of FIG. 5 in different states.
Figure 7:
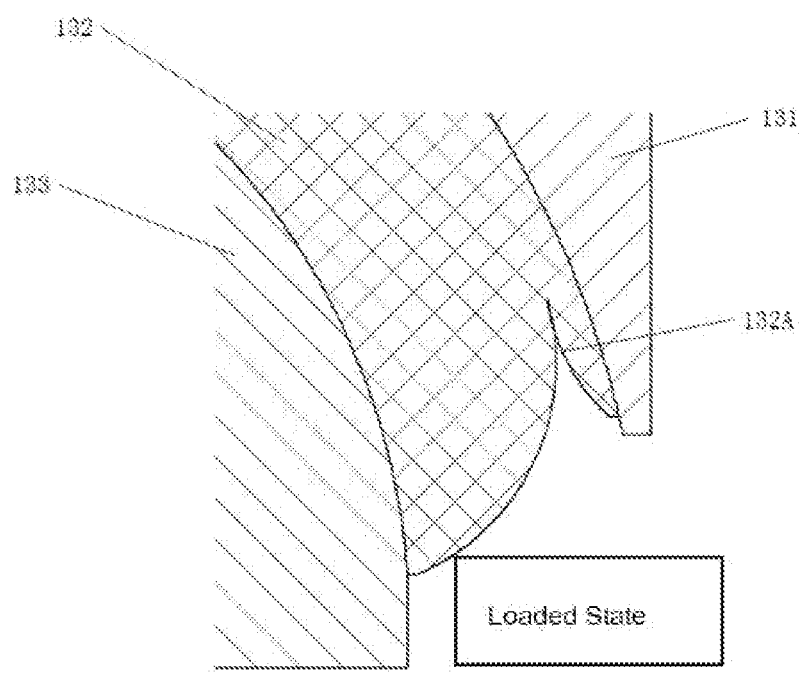

In an embodiment as shown in FIG. 5, the lower surface of the upper ball seat 131 and the upper surface of the lower ball seat 133 each include a straight segment in the middle part and an arc segment in the peripheral part. With this arrangement, it is beneficial to reduce the strain generated in the middle part and improve the longitudinal bearing capacity. In addition, a second concave portion 132A is preferably provided in the peripheral part of the elastic connecting member 132. As shown in FIG. 6, when the elastic connecting member 132 is free of load (i.e., in a free state), the second concave portion 132A has an acute-angled notch that can be readily observed. As shown in FIG. 7, when the elastic connecting member 132 is applied with a load (i.e., in a loaded state), the elastic connecting member 132 is compressed and deformed, so that the notch of the second concave portion 132A is at least partially closed up. That is, an upper side wall and a lower side wall of the second concave portion 132A are compressed to each other and thus at least partially contact together. Therefore, when the weighted assembly 3 swings relative to the tower 9, the load at the peripheral part of the elastic connecting member 132 is a static load, which is significantly beneficial to prolong the fatigue life of the elastic connecting member 132. Preferably, as shown in FIGS. 5-7, the second concave portion 132A is located near the upper ball seat 131. This structure can facilitate to manufacture the mold, and reduce the manufacturing cost of the device 100 effectively.

Figure 8:
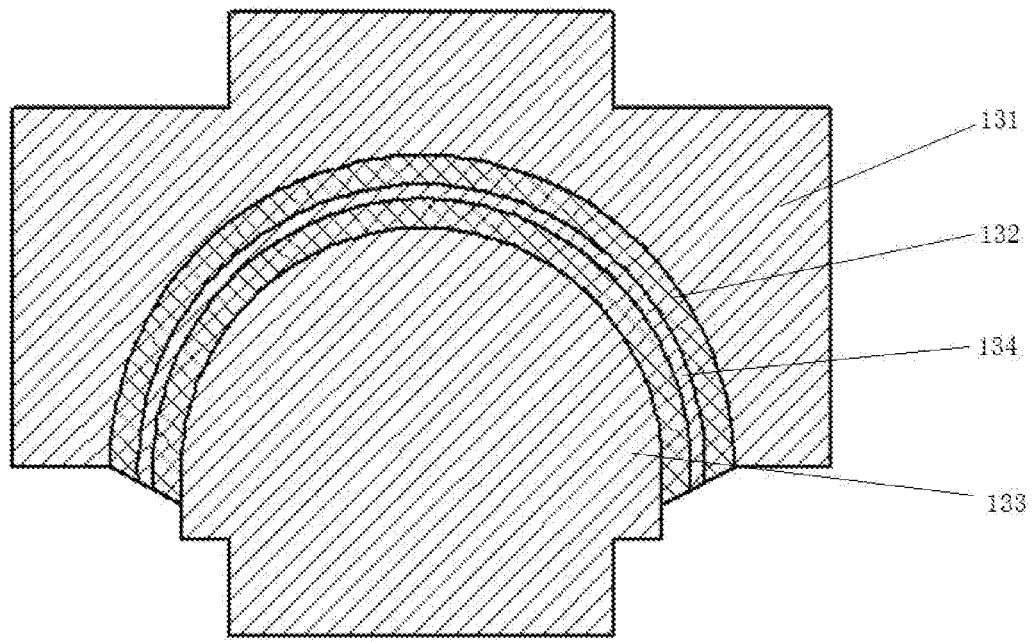
FIGS. 8 and 9 respectively show another embodiment of the top connecting assembly.
Figure 9:
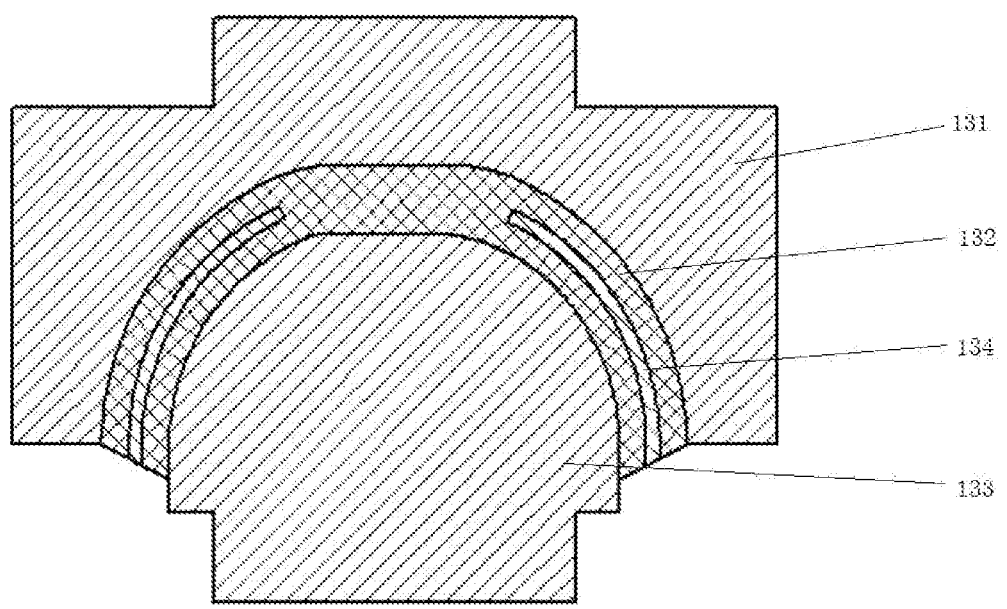

As shown in FIGS. 8 and 9, a metal spacing plate 134 may also be embedded in the elastic connecting member 132. In the embodiment as shown in FIG. 8, the metal spacing plate 134 extends in the whole elastic connecting member 132, which is more conducive to improving the longitudinal stiffness of the elastic connecting member 132, and thereby improving its longitudinal bearing capacity. In the embodiment as shown in FIG. 9, the metal spacing plate 134 extends only in the peripheral part of the elastic connecting member 132, but not to the middle part thereof. Compared with the embodiment as shown in FIG. 8, this arrangement is more beneficial to reduce the strain generated in the middle part of the elastic connecting member 132 and thus avoid fatigue. It should be understood that the metal spacing plate 134 may be one-layered or multi-layered.

Figure 10:
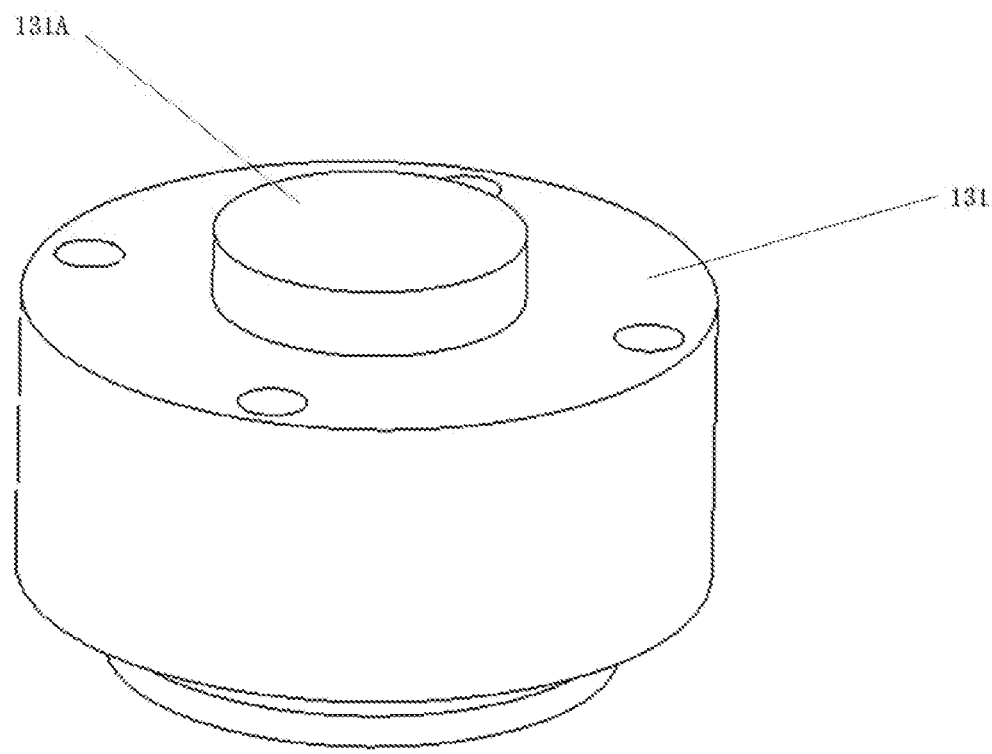
FIGS. 10 and 11 each is a perspective view showing a portion of the top connecting assembly.

The upper ball seat 131 can be fixedly connected with the second movable plate 12 through bolts. In addition, as shown in FIG. 10, a positioning boss 131A may be provided on an upper part of the upper ball seat 131. Correspondingly, a mating groove can be provided on a lower side of the second movable plate 12. When the device 100 is assembled, the upper ball seat 131 and the second movable plate 12 can be positioned to engage with each other through the cooperation of the positioning boss 131A and the groove. Preferably, the fixing connection between the upper ball seat 131 and the second movable plate 12 can be achieved with the above-mentioned positioning boss 131A together with bolts. In this manner, even if the bolts are damaged unexpectedly or can no longer function, the engagement between the positioning boss 131A and the groove can still ensure the connection between the upper ball seat 131 and the second movable plate 12, thereby ensuring that the swinging motion of the weighted assembly 3 goes smoothly.

Figure 11:
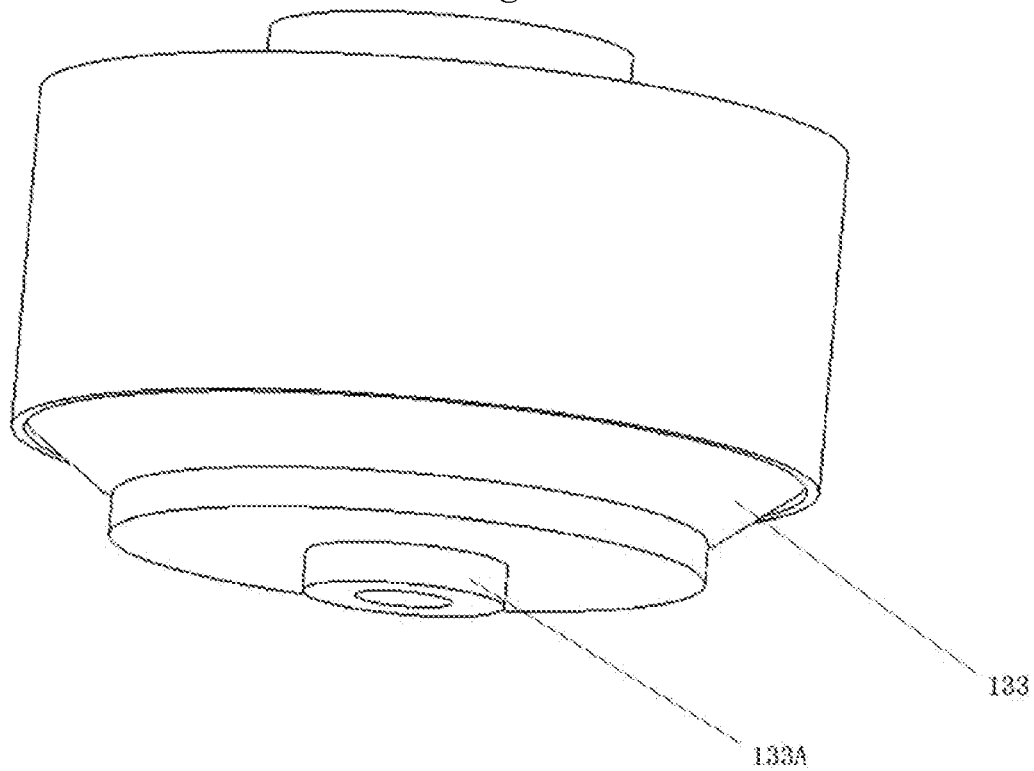

Similarly, the lower ball seat 133 can be fixedly connected with the fixing plate 14 through bolts. In addition, as shown in FIG. 11, a positioning boss 133A may be provided on a lower part of the lower ball seat 133. Correspondingly, a mating groove can be provided on an upper side of the fixing plate 14. When the device 100 is assembled, the lower ball seat 133 and the fixing plate 14 can be positioned to engage with each other through the cooperation of the positioning boss 133A and the groove. Preferably, the fixing connection between the lower ball seat 133 and the fixing plate 14 can be achieved with the above-mentioned positioning boss 133A together with bolts. In this manner, even if the bolts are damaged unexpectedly or can no longer function, the engagement between the positioning boss 133A and the groove can still ensure the connection between the lower ball seat 133 and the fixing plate 14, thereby ensuring that the swinging motion of the weighted assembly 3 goes smoothly.

In the embodiment as shown in FIGS. 2 and 3, the fixing plate 14, the lower ball seat 133, the elastic connecting member 132, the upper ball seat 131 and the second movable plate 12 of the top connecting assembly 1 form a longitudinal bearing mechanism in the present invention, wherein the fixing plate 14 and the lower ball seat 133 form a fixed connecting unit, while the upper ball seat and the second movable plate form a movable connecting unit. It should be understood that the components of the longitudinal bearing mechanism may be removed or replaced, or additional components may be introduced as required. It should also be understood that in the embodiments as shown in FIGS. 2 and 3, some components of the longitudinal bearing mechanism may correspond to those of an anti-rotation mechanism (discussed below). For example, the fixing plate 14 and the lower ball seat 133 both not only belong to the fixed connecting unit of the longitudinal bearing mechanism, but to a first connecting unit of the anti-rotation mechanism. That is to say, the embodiments as shown in FIGS. 2 and 3 include a combination of the longitudinal bearing mechanism and the anti-rotation mechanism.

The structure of the connecting head 16 described above is shown in more detail in FIG. 12. The connecting head 16 includes a substantially cylindrical inner sleeve 161 extending along the longitudinal direction, an outer sleeve 163 arranged outside the inner sleeve 161 and spaced therefrom, and an intermediate elastic layer 162 arranged between the inner sleeve 161 and the outer sleeve 163. The intermediate elastic layer 162 may be made of rubber, for example. Therefore, the connecting head 16, especially in view of the intermediate elastic layer 162 thereof, has large radial stiffness, and, at the same time, low deflection stiffness. That is to say, when the connecting head 16 is subjected to a force in the radial direction, the intermediate elastic layer 162 will be mainly subjected to a pressure in the radial direction, so that it is not easily deformed by radial compression. When the connecting head 16 is subjected to a force in the deflection direction, the intermediate elastic layer 162 is mainly subjected to a shear force in the longitudinal direction, and thus is prone to shear deformation.

Preferably, during assembly, the intermediate elastic layer 162 is squeezed between the inner sleeve 161 and the outer sleeve 163 to be pre-compressed in the radial direction. This pre-compression facilitates to extend the life of the connecting head 16. This pre-compression can be achieved by pressing the outer sleeve 163, which can be made of, for example, 20# Steel, 45# Steel or the like. The outer sleeve 163 has a thin wall thickness, and thus can be slightly deformed plastically to achieve pre-compression when being pressed.

Figure 26:
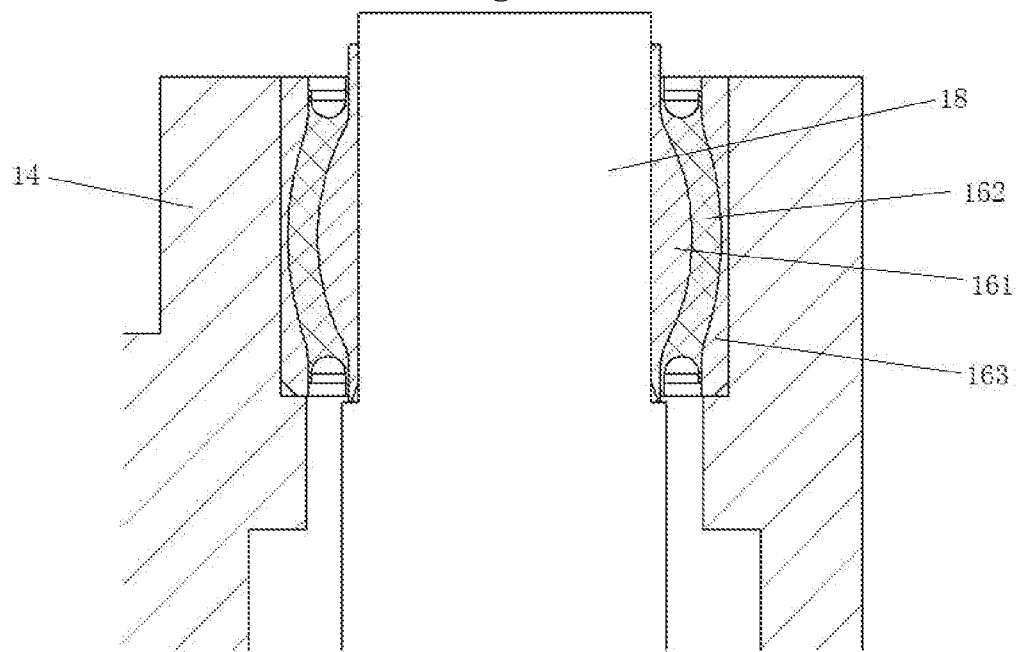
FIGS. 26 to 28 respectively show different embodiments in which the connecting head is arranged between a connecting shaft and a fixing plate.

In one embodiment, as shown in FIG. 26, the connecting head 16 can be directly mounted in a stepped hole in the fixing plate 14, wherein the outer sleeve 163 is connected to the fixing plate 14, with a lower end thereof being engaged with a stepped face of the stepped hole. In addition, the connecting shaft 18 is inserted into the inner sleeve 161. In this manner, the pre-compression of the intermediate elastic layer 162 (and the connecting head 16) can be achieved by arranging the connecting head 16 between the connecting shaft 18 and the fixing plate 14. In the embodiment as shown in FIG. 26, the inner sleeve 161 may be fixedly connected with the connecting shaft 18. Preferably, however, the inner sleeve 161 is in contact with the connecting shaft 18 but not connected thereto, thus allowing the inner sleeve 161 to slide relative to the connecting shaft 18 in the axial direction. In this case, the connecting head 16 does not apply a force to the shaft 18 in the axial direction. Accordingly, it can prevent the shaft 18 from pulling/pushing the inner sleeve 161 in the axial direction, and thus is further beneficial to avoid axial shear deformation of the intermediate elastic layer 162 caused by an axial displacement of the inner sleeve 161 relative to the outer sleeve 163. In this manner, the service life of the connecting head 16 can be advantageously prolonged.

Figure 27:
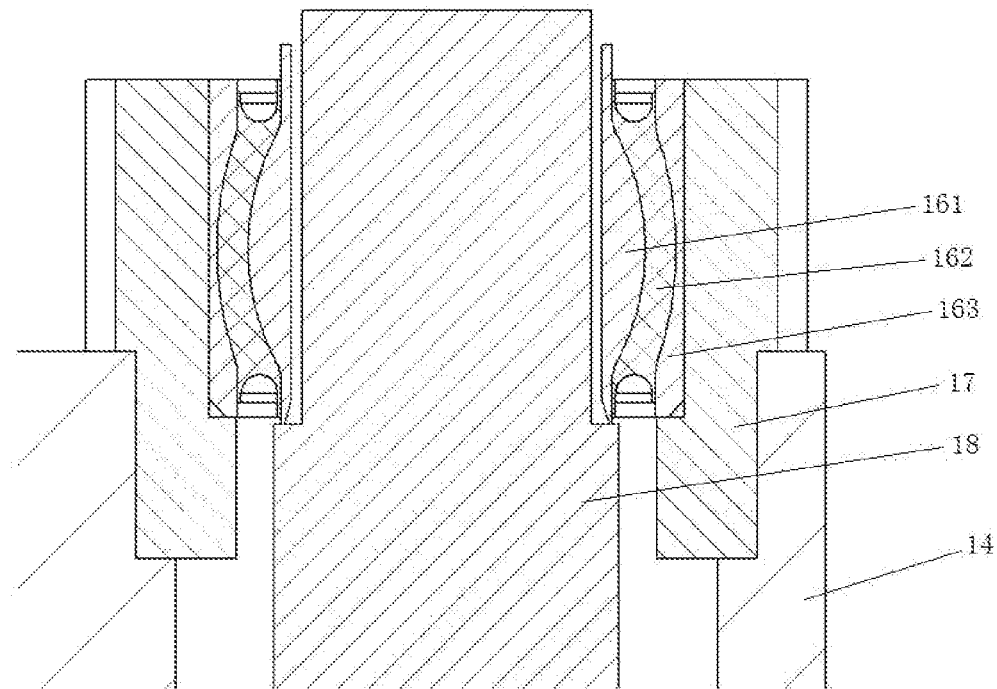

In another embodiment, as shown in FIG. 27, the connecting head 16 is connected to the fixing plate 14 through an outer mounting sleeve 17. The outer mounting sleeve 17 is fixedly connected in the stepped hole of the fixing plate 14 by means of threads or screws. The outer mounting sleeve 17 is provided with a slot for receiving the outer sleeve 163 of the connecting head 16, and the inner sleeve 161 is connected with the connecting shaft 18 inserted therein. In this case, the outer mounting sleeve 17 is provided with a stepped surface which is mated with a lower end of the outer sleeve 163 of the connecting head 16. With this arrangement, the mounting sleeve 17, the connecting head 16 and the connecting shaft 18 can be assembled together to form into one piece. Thus, the pre-compression of the intermediate elastic layer 162 (and the connecting head 16) can be achieved by arranging the connecting head 16 between the mounting sleeve 17 and the connecting shaft 18. After that, the mounting sleeve 17, the connecting head 16 and the connecting shaft 18 can, as a whole, be assembled with the fixing plate 14 and the first movable plate 15. By pre-compressing the connecting head 16 in advance, the operation for installing the entire device 100 at a construction site can be convenient and simple. In the embodiment as shown in FIG. 27, a certain gap is left between the inner sleeve 161 and the connecting shaft 18. Therefore, it effectively ensures that the connecting shaft 18 can freely slide relative to the inner sleeve 161 in the axial direction.

Figure 28:
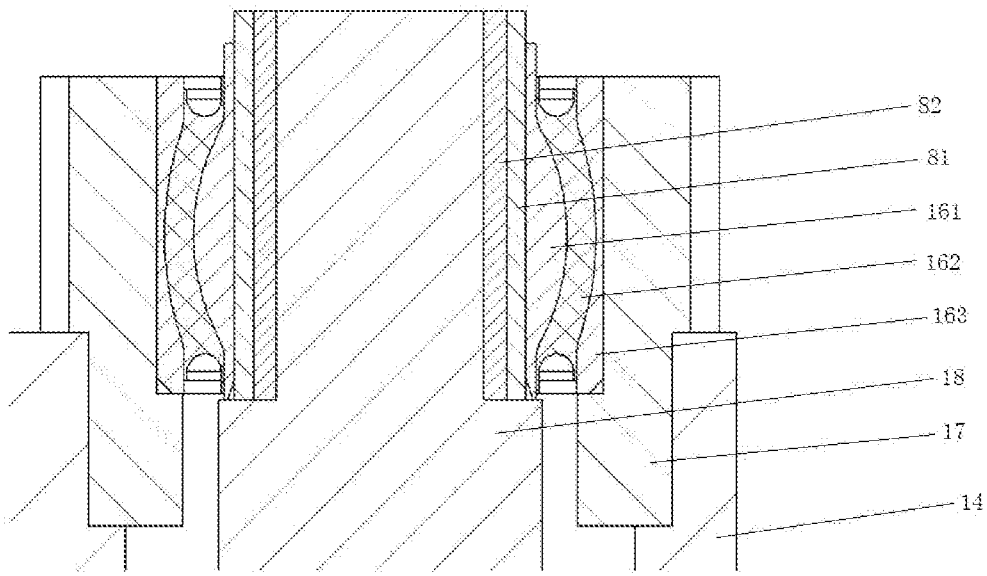

In the embodiment as shown in FIG. 28, the connecting head 16 is connected to the fixing plate 14 through the outer mounting sleeve 17. In addition, a linear bearing or a wear-resistant material body 82 is further provided between the inner sleeve 161 of the connecting head 16 and the connecting shaft 18, and an inner mounting sleeve 81 is further provided between the linear bearing or the wear-resistant material body 82 and the inner sleeve 161. By providing the inner mounting sleeve 81 and the outer mounting sleeve 17 at inner and outer sides of the connecting head 16 in advance, respectively, the connecting head 16 can be pre-compressed. Then, the combination thus formed can be mounted between the fixing plate 14 and the linear bearing or the wear-resistant material body 82. Since the outer mounting sleeve 17, the connecting head 16, the inner mounting sleeve 81, the linear bearing or the wear-resistant material body 82 and the connecting shaft 18 are press-fitted to each other, it is beneficial to achieve a compact and stable installation, and also facilitates further compression of the intermediate elastic layer 162 in the connecting head 16. At the same time, the slide of the connecting shaft 18 relative to the connecting head 16 in the axial direction can be effectively achieved through the linear bearing or the wear-resistant material body 82.

The wear-resistant material body 82 in the context can be made of, for example, modified high molecular polyethylene, nylon, or the like.

It should be understood that a certain gap (see FIG. 3) has to be left between the fixing plate 14 and the connecting shaft 18, so as to ensure that the connecting shaft 18 is able to swing freely.

Figure 12:
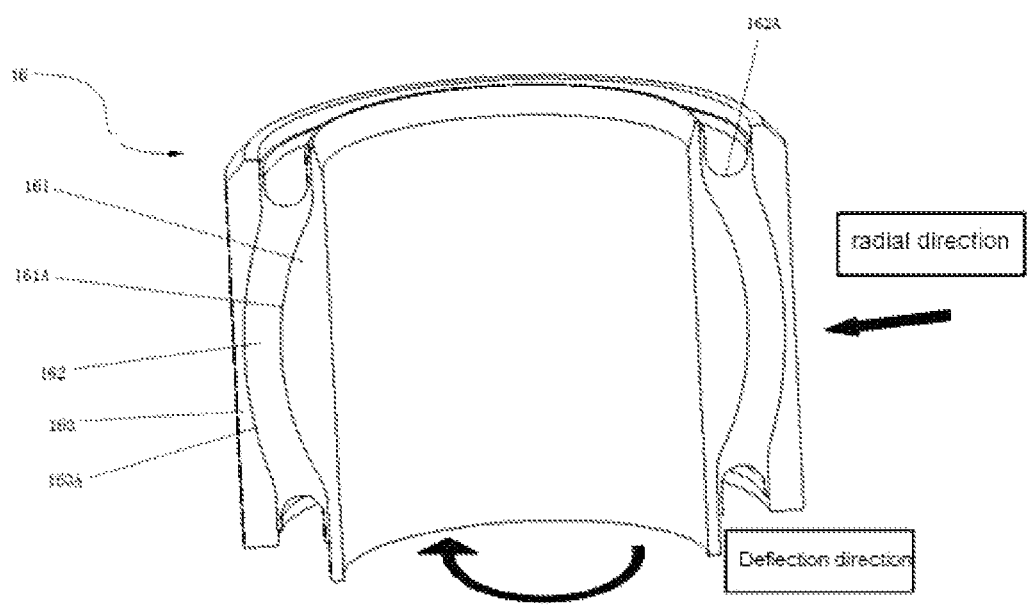
FIG. 12 is a cross-sectional view of a connecting head of the top connecting assembly in an embodiment.

Preferably, as shown in FIG. 12, an inner side surface 163A of the outer sleeve 163 and an outer side surface 161A of the inner sleeve 161 are each configured as an arched surface, which has a central part in the longitudinal direction protruding radially outward. With this arrangement, the deflection stiffness of the connecting head 16 can be further reduced advantageously. This is because when the outer sleeve 163 and the inner sleeve 161 are respectively subjected to opposite forces in the longitudinal direction, the intermediate elastic layer can generate relatively much shear deformation and relatively less compressive deformation.

In addition, preferably, as shown in FIG. 12, an upper edge and a lower edge of the intermediate elastic layer each are configured with a first concave portion 162A. By means of providing such a first concave portion 162A, the deformations generated at the edges of the intermediate elastic layer are substantially shear deformations but substantially no compression deformations, when the outer sleeve 163 and the inner sleeve 161 are respectively subjected to opposite forces in the longitudinal direction. In this manner, the shear stiffness of the connection head 16 can be further reduced advantageously.

With the above arrangement, when the weighted assembly 3 and the connecting rod 2 swing laterally relative to the tower 9, the weighted assembly 3, the connecting rod 2, the first movable plate 15, the connecting shaft 18 and the inner sleeve 161 can, as a whole, swing relative to the outer sleeve 163, the outer mounting sleeve 17 (if any), the fixing plate 14, the supporting tube 11 and the tower beam 91. Therefore, when the tower 9 per se suffers lateral sway, the above-mentioned structure can generate a swing in the opposite direction, so as to weaken the lateral sway of the tower 9.

In addition, as shown in FIGS. 2 and 3, the top connecting assembly 1 includes a pair of the above-mentioned connecting shafts 18, and a pair of connecting heads 16 accordingly. The two connecting shafts 18, together with corresponding connecting heads 16, are spaced apart from each other in the lateral direction. Since the connecting heads 16 have great radial stiffness, the intermediate elastic layers 162 of the connecting heads 16 would not undergo significant compressive deformation, when the weighted assembly 3 and the connecting rod 2, together with the first movable plate 15, the connecting shafts 18 and the inner sleeve 161, are inclined to rotate laterally as a whole. In this case, the above-mentioned inclination does not mature into an actual motion, or results in a rotation which is too small to be taken into account.

The distance between two connecting shafts 18 can be adjusted as required. The greater the distance, the easier it is to avoid the above-mentioned rotation.

In the embodiment as shown in FIGS. 2 and 3, the fixing plate 14, the first movable plate 15, the pair of connecting shafts 18 and the pair of connecting heads 16 of the top connecting assembly 1 as mentioned above constitute the anti-rotation mechanism in the present invention, wherein the fixing plate 14 forms the first connection portion, while the first movable plate 15 forms the second connection portion. It should be understood that, according to needs, the components of the anti-rotation mechanism may be removed or replaced, or new components may be introduced in the anti-rotation mechanism.

Figure 4:
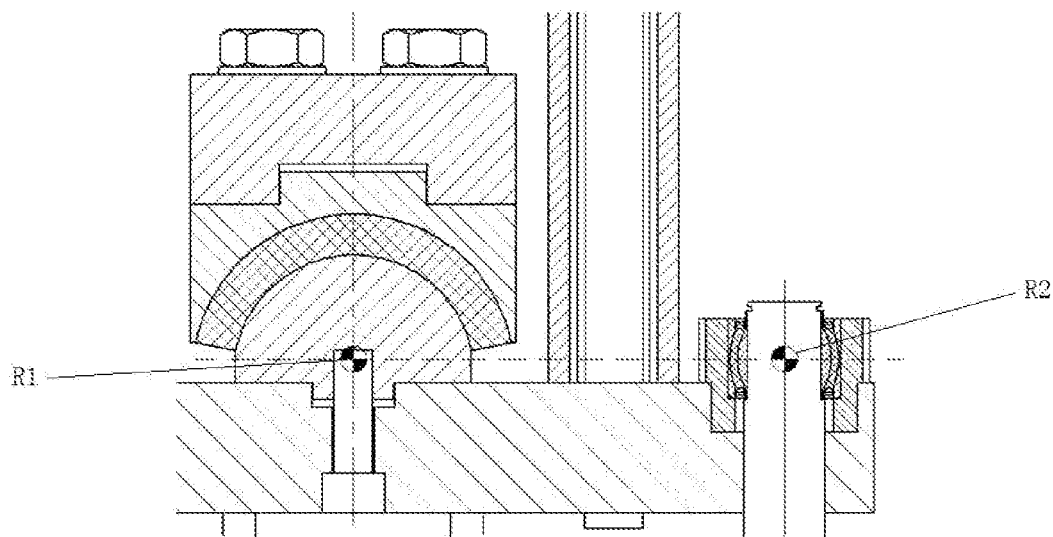
FIG. 4 is a partial cross-sectional view of the top connecting assembly of FIG. 3.

In a preferred embodiment, as shown in FIG. 4, a rotation center R2 of the elastic connecting member 132 and a rotation center R2 of the intermediate elastic layer 162 of the connecting head 16 are aligned with each other in the lateral direction, i.e., located at a same height. With this arrangement, the stress and strain borne by the elastic connecting member 132 and the intermediate elastic layer 162 are relatively uniform, so that the service life of the top connecting assembly can be effectively prolonged.

In addition, the fixing plate 14 may further be provided with at least one hoisting hole 154. If replacement and maintenance of various components in the top connecting assembly 1 are desired, the second movable panel 15 can be temporarily connected to the top of the tower 9 by connecting a hoisting rod (not shown) between the hoisting hole 154 and the tower beam 91. Then, replacement and maintenance of various components as shown in FIG. 2 can be readily performed.

Figure 21:
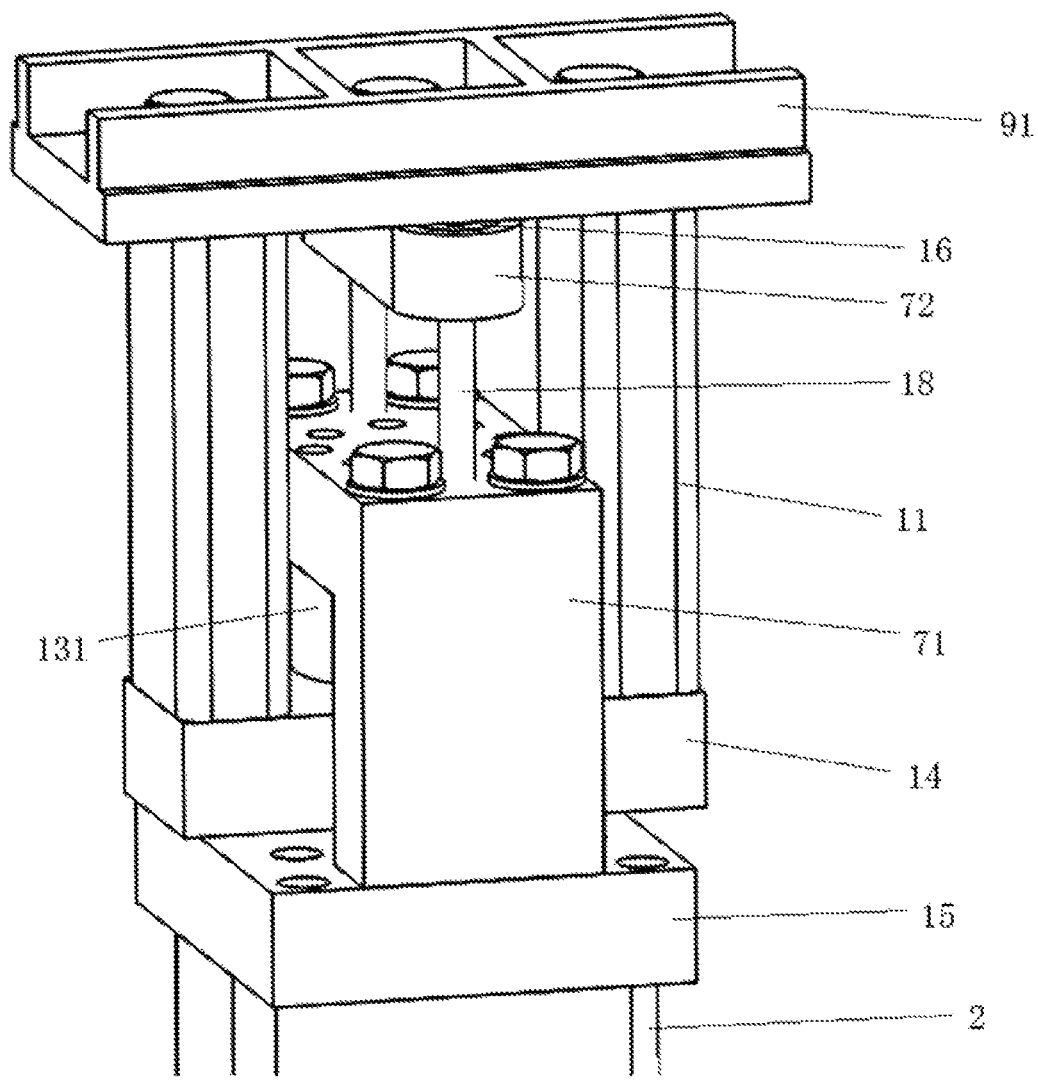
FIGS. 21 and 22 show the top connecting assembly, in another embodiment, of the tunable mass damping device according to the present invention.
Figure 22:
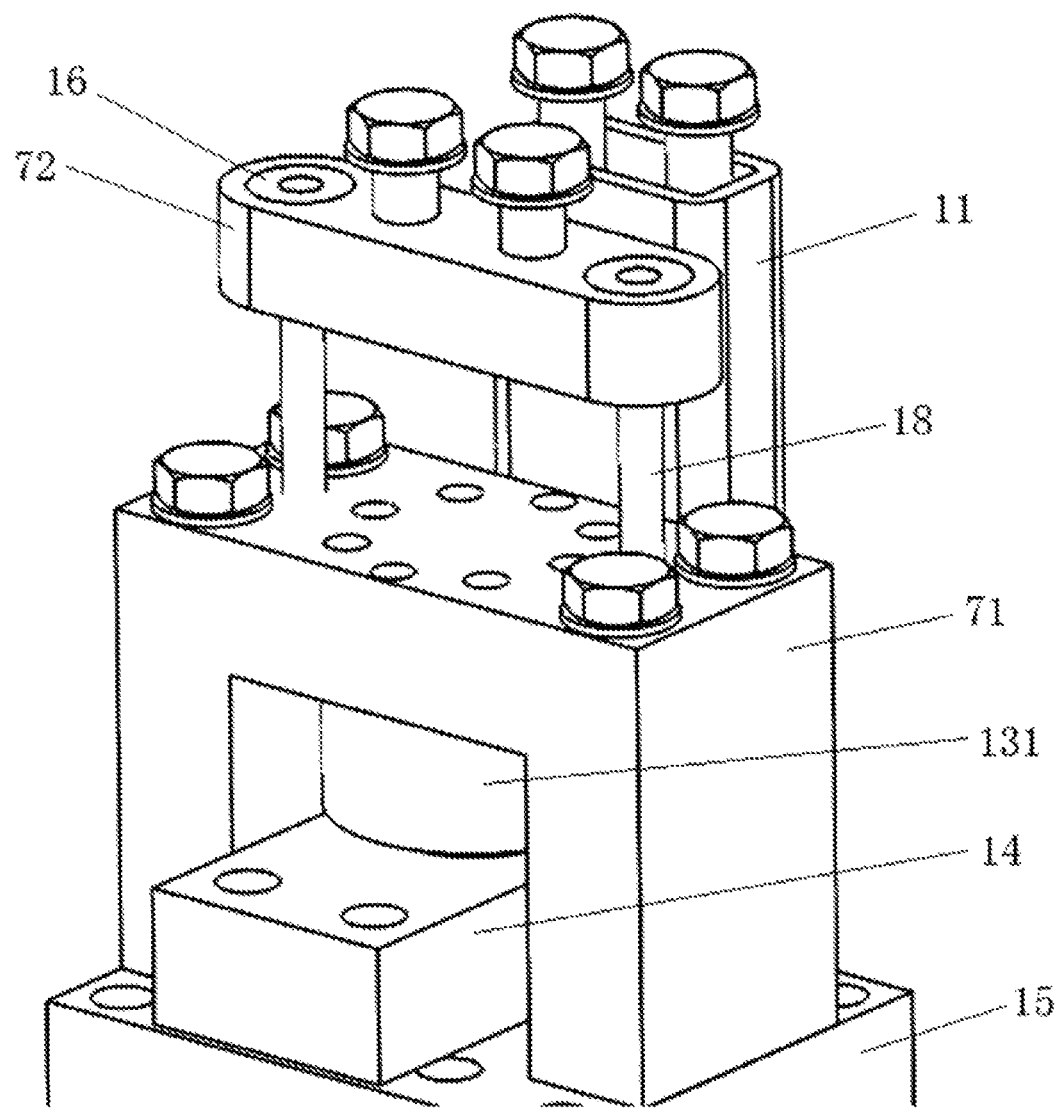

FIGS. 21 and 22 show another embodiment of the top connecting assembly 1. In this embodiment, the second movable plate 12 and the auxiliary connecting element 19 are replaced with an integral U-shaped movable member 71. That is to say, in this embodiment, the movable connecting unit of the longitudinal bearing mechanism consists of the upper ball seat 131 and the movable member 71. It should be understood that the movable member 71 can also be used in the embodiment as shown in FIG. 2. However, compared with the integral movable member 71, it is easier to separate the second movable plate 12 from the auxiliary connecting element 19 if they are independent; on the contrary, it is easier to mount the integral movable member 71.

In addition, in the embodiment as shown in FIGS. 21 and 22, the anti-rotation mechanism includes a top fixing member 72, which is fixedly connected to the tower beam 91 by means of bolts. Two connecting heads 16 spaced from each other are provided in the top fixing member 72. An upper end of each of two connecting shafts 18 spaced from each other is inserted into a respective one of the pair of connecting heads 16, and a lower end thereof extends downward in the longitudinal direction to be fixedly connected with the movable member 71. With this arrangement, the connecting shaft 18 can be conveniently longer, which is beneficial for the weighted assembly 3 to swing more flexibly, compared with the embodiment as shown in FIG. 2. However, the structure as shown in FIG. 2 is beneficial to set the distance between the two connecting shafts 18 larger, thus avoiding self-rotation of the weighted assembly 3.

In the embodiment as shown in FIGS. 21 and 22, the longitudinal bearing mechanism and the anti-rotation structure also share a certain components in terms of structure. For example, the movable part 71 belongs to the movable connecting unit of the longitudinal bearing mechanism, and also to the second connecting portion of the anti-rotation mechanism. That is to say, the embodiment as shown in FIGS. 21 and 22 also include a combination of the longitudinal bearing mechanism and the anti-rotation mechanism.

Figure 29:
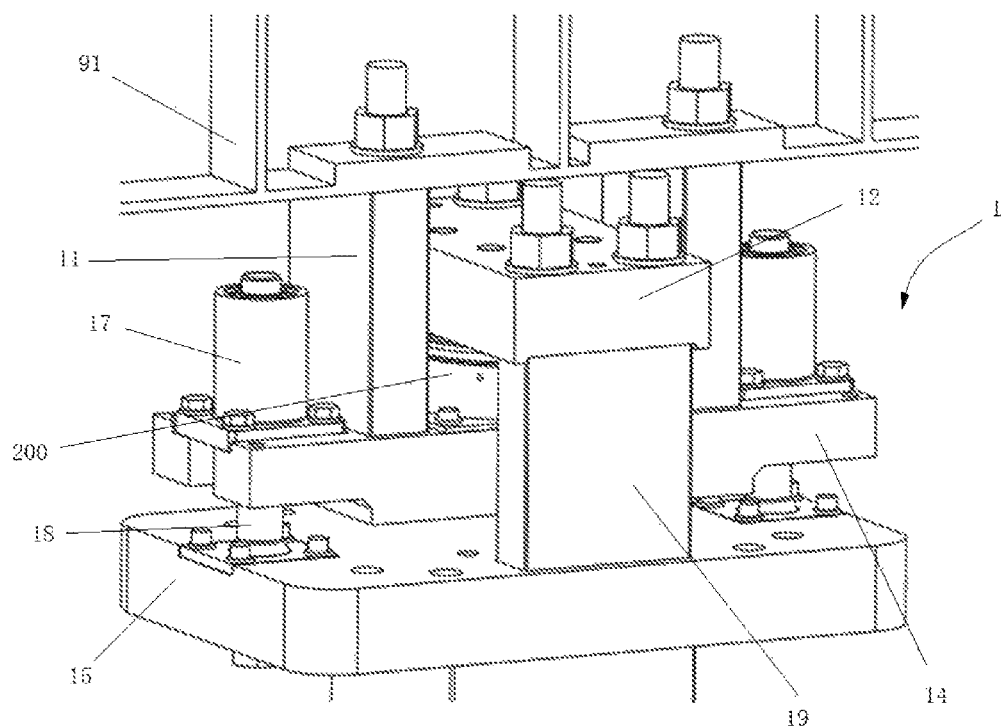
FIG. 29 shows the top connecting assembly, in another embodiment, of the tunable mass damping device according to the present invention.
Figure 30:
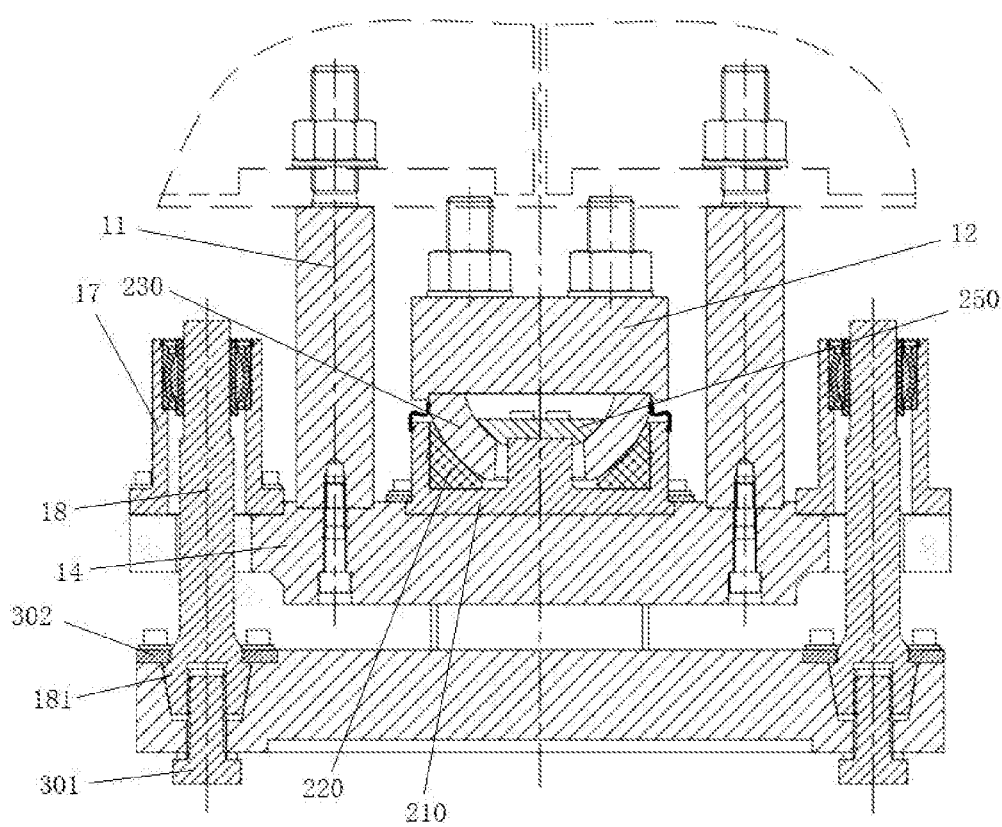
FIG. 30 is a cross-sectional view of a portion of the top connecting assembly of FIG. 29.
Figure 31:
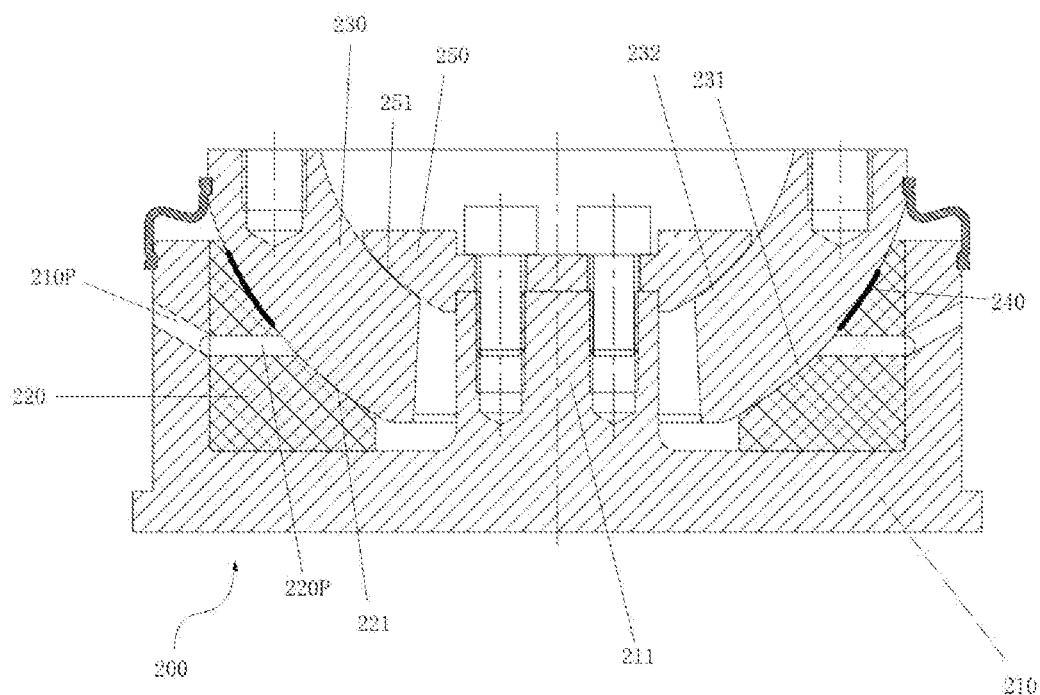
FIG. 31 is an enlarged view of the portion of the top connecting assembly of FIG. 30.

FIGS. 29-31 show another embodiment of the top connecting assembly 1 used in the tunable mass damping device 100 according to the present invention. This embodiment is similar to the embodiment as shown in FIGS. 2-3, but with the following differences.

As shown in FIG. 30, a lower end of the connecting shaft 18 is configured as an expansion cone 181, which is inserted into the first movable plate 15 from a first side of the first movable plate 15, and connected therewith through a first screw 301 which is inserted from a second side of the first movable plate 15. As a result, the connecting shaft 18 can be preloaded. When the expansion cone 181 is inserted into the first movable plate 15, it can be restricted within the first movable plate 15 through a pressing plate 302, which is arranged to cover the expansion cone 181 from the first side of the first movable plate 15 and is fixedly connected to the first movable plate 15, for example, by means of screws. Therefore, the connection between the connecting shaft 18 and the first movable plate 15 can be further prevented from being loosened.

In addition, as shown in FIGS. 30 and 31, a bearing seat 200 is fixedly mounted on the fixing plate 14. As shown in FIGS. 30 and 31, the bearing seat 200 may include a bearing housing 210, and a filler body 220 disposed in the bearing housing 210. The filling body 220 is configured to have a first bearing engagement surface 221, which is arcuately concave facing upward. It should be understood that the filler body 220 and the bearing housing 210 may also form into one piece, if required.

A bearing slider 230 is provided under the second movable plate but above the bearing seat 200. The bearing slider 230 is configured to have a second bearing engagement surface 231, which is arcuately convex facing downward. The second bearing engagement surface 231 and the first bearing engagement surface 221 are in contact with each other, so that the bearing slider 230 can slide along the first bearing engagement surface 221.

In the preferred embodiment as shown in FIG. 31, one or more wear-resistant sheets 240 are provided on the first bearing engagement surface 221. The wear-resistant sheet 240 is beneficial to improve effectiveness and durability of the cooperation between the bearing slider 230 and the bearing seat 200. For the embodiment in which the wear-resistant sheets 240 are provided, the filler body 220 is preferably made of a relatively soft metal material, such as copper, to facilitate the arrangement of the wear-resistant sheets 240. The bearing housing 210 can be made of a relatively hard metal material, so as to provide sufficient protection.

As shown in FIGS. 30 and 31, the bearing slider 230 is further configured to have a third bearing engagement surface 232, which is arcuately concave facing upward. Thus, the bearing slider 230 as a whole is formed in a substantially bowl shape. A limiting plate 250 is provided on the bearing slider 230, and is configured to have a fourth bearing engagement surface 251, which is arcuately convex facing downward. The fourth bearing engagement surface 251 is in contact with the third bearing engagement surface 232, so that the bearing slider can slide along the fourth bearing engagement surface 251. That is, an arc-shaped sliding path is defined between the limiting plate 250 and the filler body 220, and the bearing slider 230 can slide along the path accordingly.

In the embodiment shown in FIG. 31, the filler body 220 and the first bearing engagement surface 221 are both annular. The bearing slider 230 is also annular. A connecting protrusion 211 extending upward from the middle of the bearing housing 210 is provided. The connecting protrusion 211 passes through the centers of the filler body 220 and the bearing slider 230, and is fixedly connected with the limiting plate 250 through, such as, screws. The inner diameter of the annular bearing slider 230 is larger than the outer diameter of the connecting protrusion 211. Therefore, the sliding range of the bearing slider 230 can be restricted by the inner diameter of the bearing slider 230 and the outer diameter of the connecting protrusion 211.

In addition, as shown in FIG. 31, lubricant passages 210P and 220P are provided in the bearing housing 210 and the filler body 220 of the bearing seat 200, and communicate the outside of the bearing seat 200 with the first bearing engagement surface 221. In this manner, lubricant can be supplied to the first bearing engagement surface 221 and the second bearing engagement surface 231 through the lubricant passages 210P, 220P.

Figure 13:
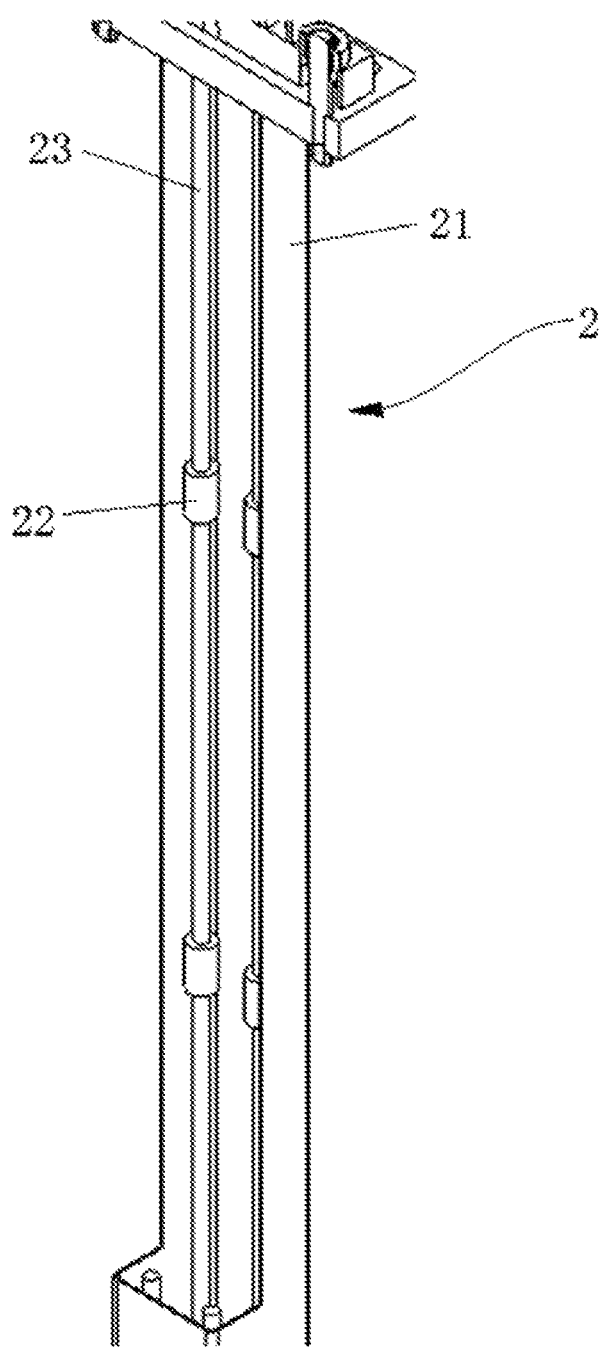
FIGS. 13 and 14 schematically show the structure of a connecting rod of the tunable mass damping device in an embodiment.
Figure 14:
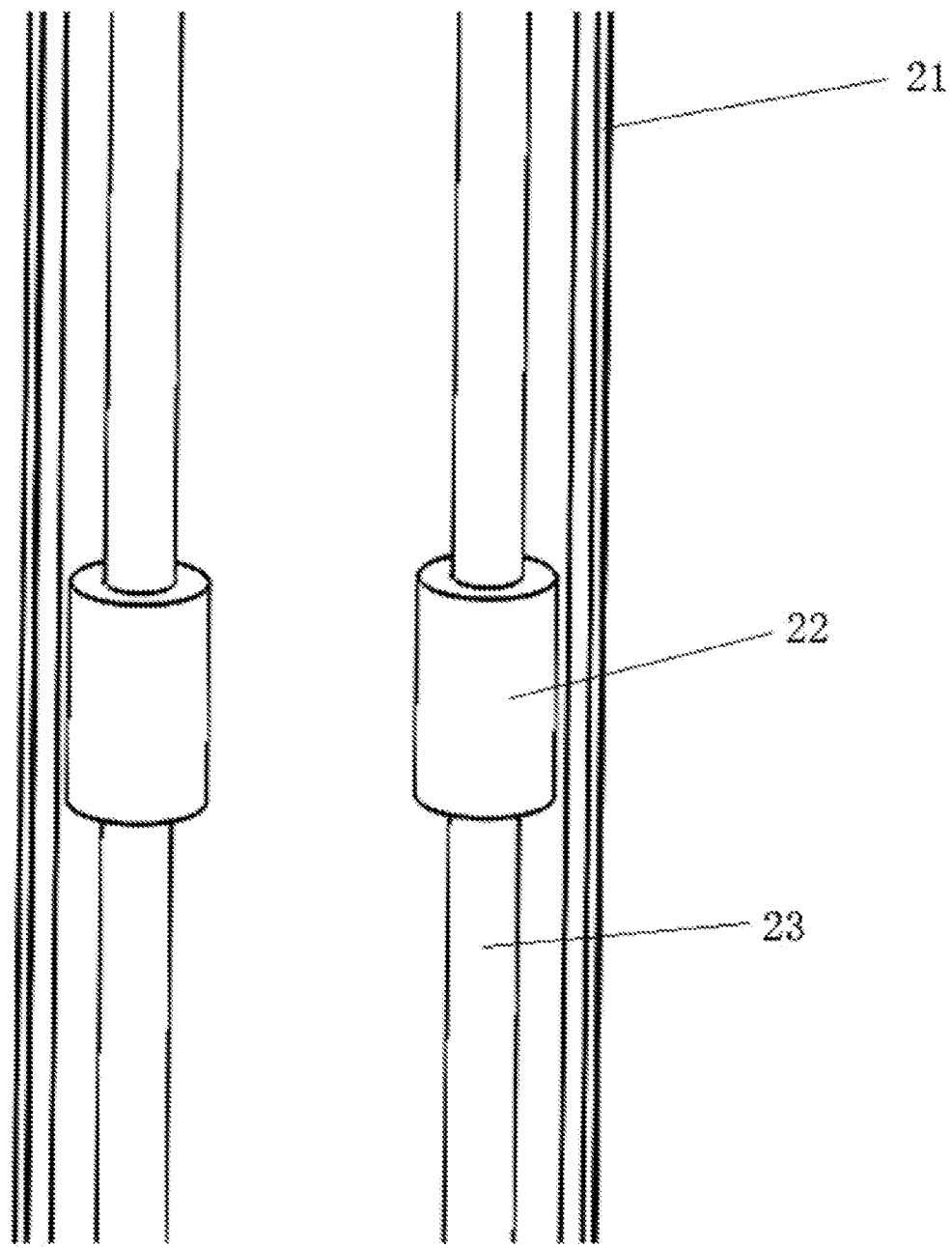

FIGS. 13 and 14 show the structure of the connecting rod 2 in detail. The connecting rod 2 includes an elongated connecting core shaft, which can be one or more screw shafts 23. For example, for a very long connecting rod 2, a plurality of screw shafts 23 can be connected together in the longitudinal direction by means of joints 22. An upper end of the screw shaft 23 is connected with the first movable plate 15 of the top connecting assembly 1 through threads, while a lower end thereof is fixedly connected with the weighted assembly 3. As shown in FIG. 13, a plurality of connecting core shafts can be arranged parallel to each other to ensure the stability of the connection between the top connecting assembly 1 and the weighted assembly 3. Alternatively, the connecting core shaft may be a wire rope, a sling, or the like. In addition, the connecting rod 2 further includes an outer casing 21 arranged around the connecting core shaft. The outer casing 21 is sandwiched between the top connecting assembly 1 and the weighted assembly 3, so that the elongated connecting core shaft can be effectively prevented from being bent. Said connecting rod 2 can effectively reduce its own weight on the one hand, and realize stable connection on the other hand.

Figure 15:
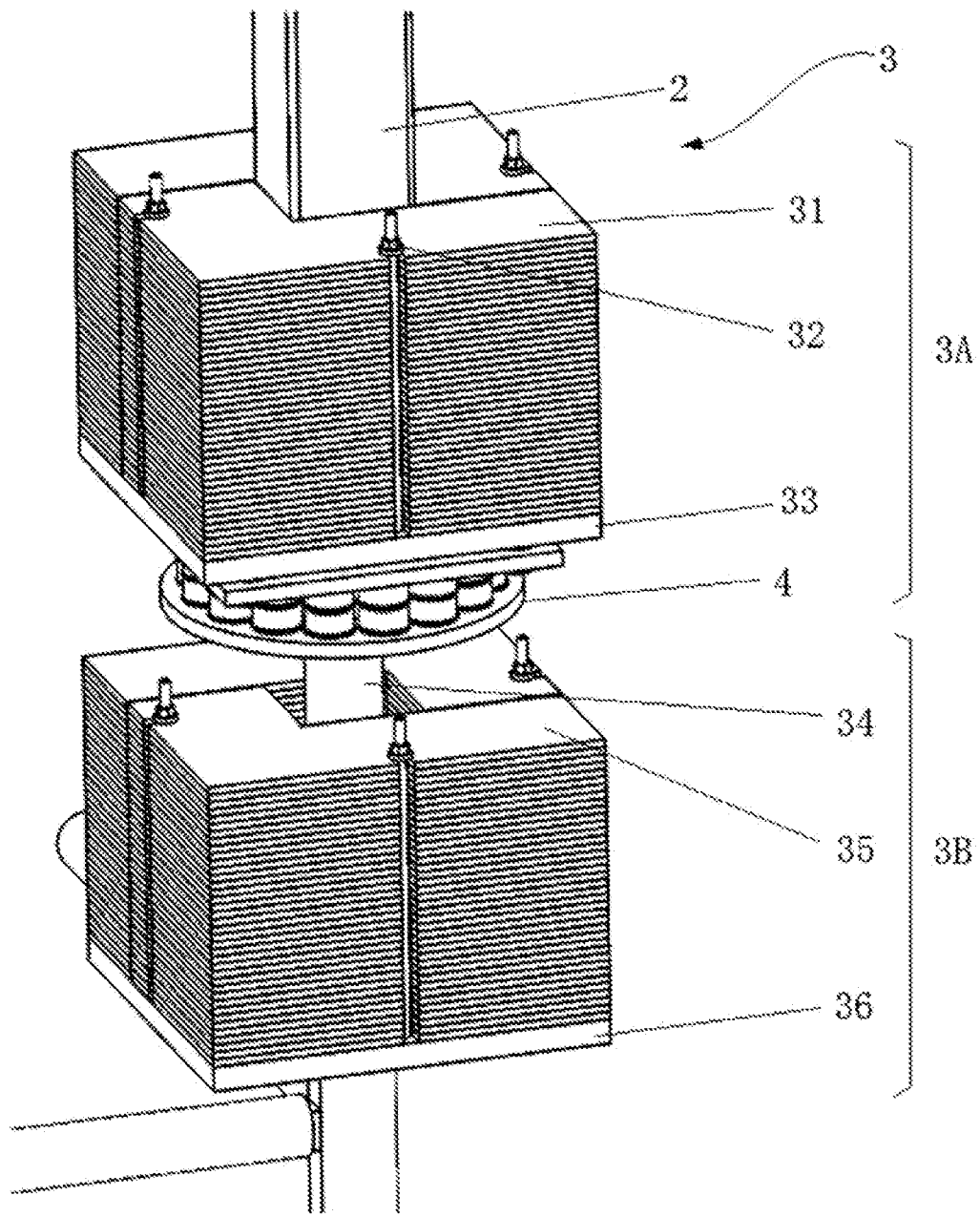
FIGS. 15 and 16 show a weighted assembly of the tunable mass damping device in an embodiment.
Figure 16:
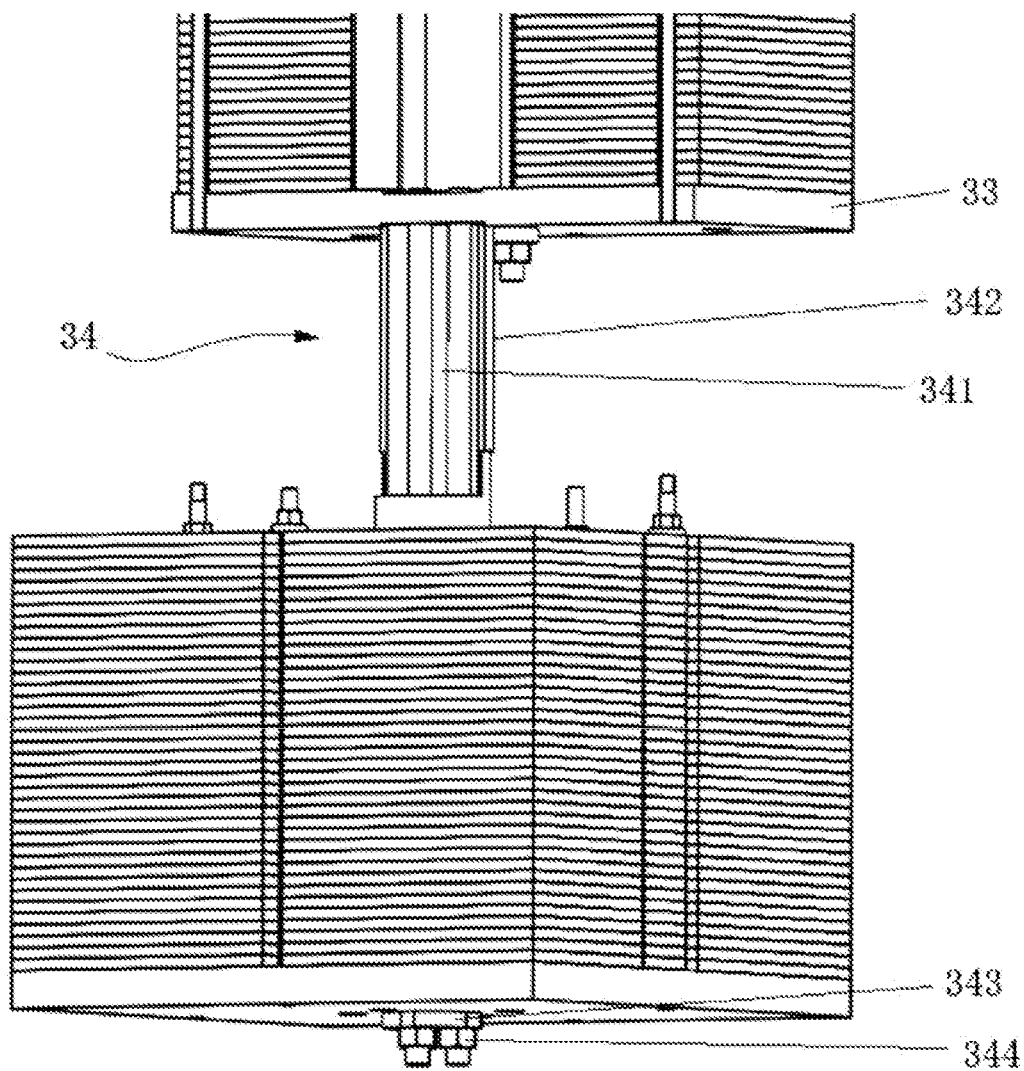

FIGS. 15 and 16 show the structure of the weighted assembly 3 in detail. The weighted assembly 3 includes two weighting units 3A, 3B, which are spaced apart from each other in the longitudinal direction. The weighting unit 3A is fixedly connected to the lower end of the connecting rod 2. The weighting unit 3B is connected to the weighting unit 3A through a connecting rod 34. The connecting rod 34 is similar to the connecting rod 2 in structure, including a screw shaft 341 and an outer casing 342, the specific structure and cooperation of which will not be discussed here.

The weighting unit 3A includes a tray 33 extending in the lateral direction, and one or more weighting plates 31 arranged on the tray 33 in a stack. The connecting rod 2 may extend to the tray 33 and is fixedly connected therewith. The weighting plate 31 may consist of two parts, which are arranged around the connecting rod 2 to enclose the same. This structure is beneficial to use more or less weighting plates in operation, thereby facilitating adjustment of the weight of the weighting unit and thus adjusting the center of gravity of the device 100. The weighting plates 31 may be fixed to the tray 33 by means of a bolt 32.

Preferably, a groove is provided in a lower surface of the tray 33 at a position corresponding to the connecting rod 34, so that an upper end of the connecting rod 34 can be inserted into the groove during assembly, in order to facilitate positioning.

Similarly, the weighting unit 3B includes a tray 36 and one or more weighting plates 35. The weight plates 35 are arranged around the connecting rod 34 to enclose the same. As shown in FIG. 16, the connecting rod 34 extends downward to the tray 36, wherein the screw shaft 341 of the connecting rod 34 passes through the tray 36 and is fixedly connected therewith through a backing plate 343 and nuts 344.

It should be understood that according to actual needs, there may be provided with only one weighting unit, or three, four or more weighting units. Additionally, according to actual needs, the weighting plate may be configured as rectangular, circular, triangular, or any other suitable shape. In the case where only one weighting unit is provided, the colliding mechanism 4 is arranged under said one weighting unit. In the case where three or more weighting units are provided, the colliding mechanism 4 may be provided between two adjacent weighting units.

Figure 17:
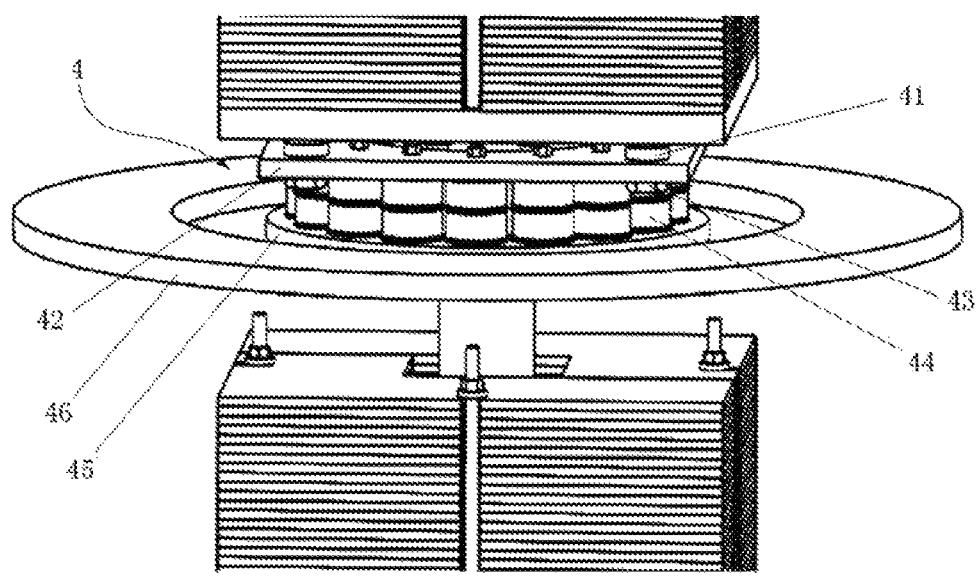
FIGS. 17 and 18 show a colliding mechanism of the tunable mass damping device in an embodiment.
Figure 18:
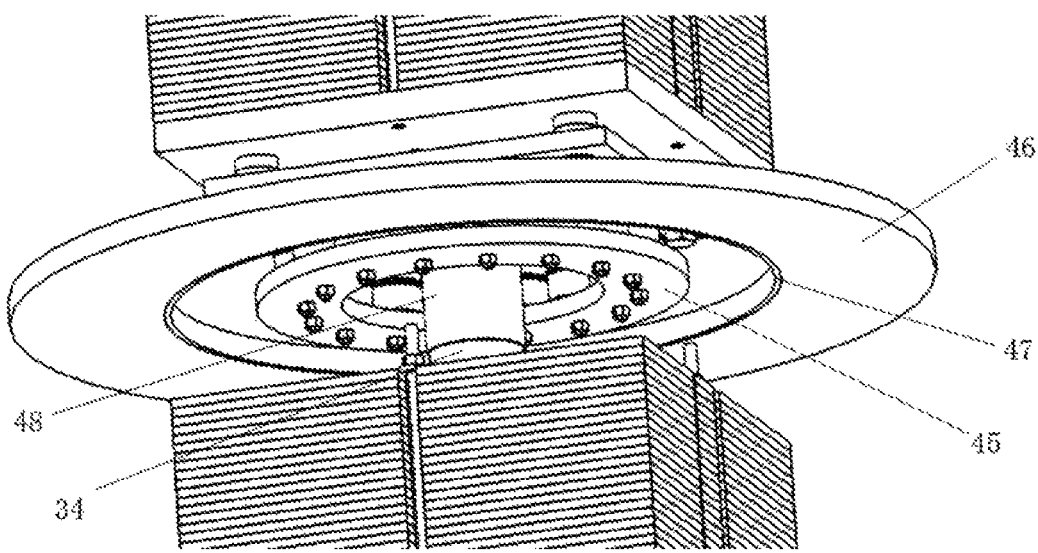

As shown in FIG. 15, the colliding mechanism 4 is provided between two weighting units 3A, 3B. FIGS. 17 and 18 show the specific structure of the colliding mechanism 4.

As shown in FIG. 17, the colliding mechanism 4 includes at least one elastic buffering member 44 made of rubber. The elastic buffering member 44 is configured as a column extending in the longitudinal direction. An upper end of the elastic buffering member 44 is fixedly connected to a mounting plate 42, and a lower end thereof is fixedly connected to a colliding body 45. The mounting plate 42 is attached to the tray 33 of the weighting unit 3A through bolts 43. One or more spacers 41 can be arranged between the mounting plate 42 and the tray 33 as required, so as to adjust the height of the mounting plate 42 and finally adjust the height of the colliding body 45.

Corresponding to the colliding body 45, a colliding counterpart 46 is arranged in the tower cylinder 9 and fixed relative thereto. The colliding counterpart 46 can, for example, be annular, and enclose the colliding body 45. The height of the colliding body 45 is adjusted to be the same as that of the colliding counterpart 46. The colliding body 45 will swing as the weighted assembly 3 swings. When the swinging motion of the weighting assembly 3 and the colliding body 45 exceeds a certain range, the colliding body 45 will collide with the colliding counterpart 46. At this time, the swinging motion of the colliding body 45 will be hindered, but that of the weighted assembly 3 will still continue due to inertia, so that the elastic buffering member 44 will suffer shear deformation. The shear deformation can dissipate the energy for the weighted assembly 3 to further swing, and generate a force in an opposite direction to restrain the weighted assembly 3 from further swinging. In this way, it is advantageous that the swinging amplitude of the weighted assembly 3 cannot be further increased.

As shown in FIG. 18, the colliding body 45 may be annular so that the connecting rod 34 can pass therethrough to connect two weighting units 3A, 3B together. A certain interval is kept between the connecting rod 34 and the colliding body 45 to leave a space for the connecting rod 34 to swing when the colliding body 45 stops swinging but the connecting rod 34 continues to swing due to inertia. An elastic pad 48 can be arranged around the connecting rod 34 to buffer any possible collision between the connecting rod 34 and the colliding body 45. As an alternative or in addition, a corresponding elastic pad can also be provided on an inner side of the colliding body 45.

Preferably, as shown in FIG. 18, an elastic pad 47 is provided on an inner side of the colliding counterpart 46 to buffer the collision between the colliding counterpart 46 and the colliding body 45. As an alternative or in addition, a corresponding elastic pad can also be provided on an outer side of the colliding body 45. Said elastic pads 47 and 48 can be made of relatively soft metal or polymer material, such as, pure aluminum, polyurethane, or the like.

In a preferred embodiment, by means of the weighted assembly 3, the center of gravity of the device 100 can be adjusted to the position of the colliding mechanism 4, especially of the colliding body 45 thereof. Therefore, when the colliding body 45 collides with the colliding counterpart 46, the swinging motion of the weighted assembly 3 can be stopped conveniently and effectively.

In the embodiment as shown in FIG. 17, a plurality of cylindrical elastic buffering members 44 is provided. These elastic buffering members 44 are arranged adjacent to each other in sequence on the annular colliding counterpart 46, thus forming a ring shape.

Figure 23:
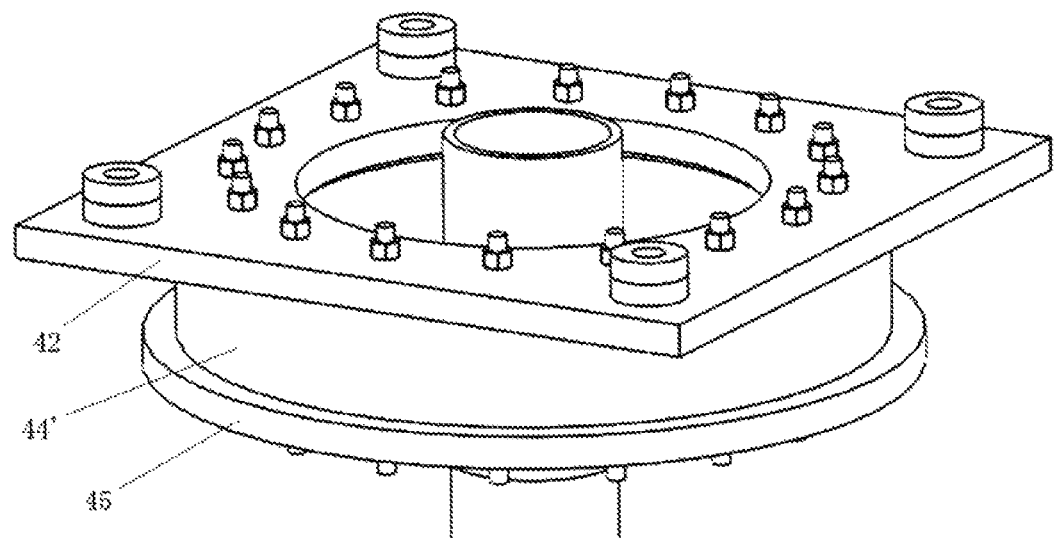
FIGS. 23 and 24 show the colliding mechanism in another embodiment.
Figure 24:
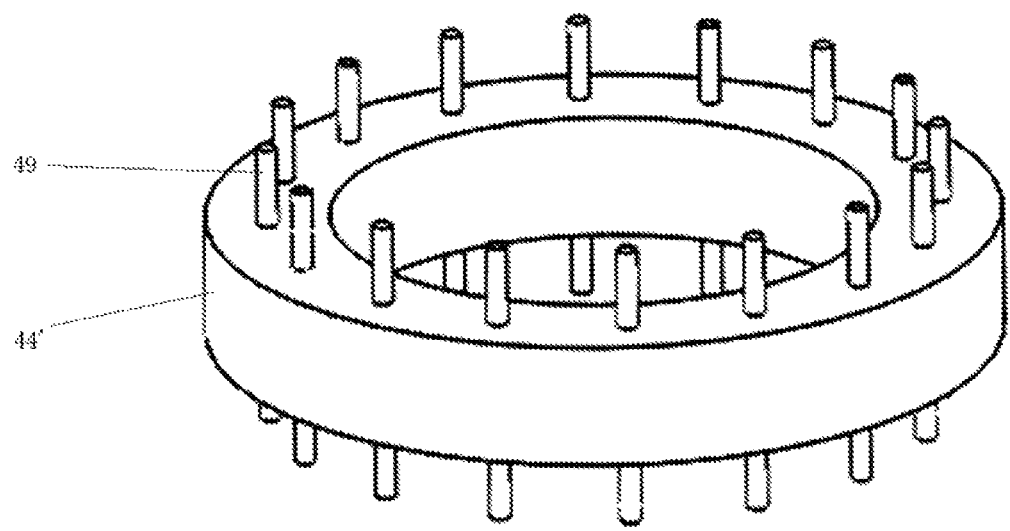

FIGS. 23 and 24 show an elastic buffering member 44' according to another embodiment. The elastic buffering member 44' is configured as an integral annular member. A plurality of studs 49 is provided along an annular surface of the elastic buffering member 44'. These studs 49 can be used for fixedly connecting the mounting plate 42 with the colliding body 45. Compared with the arrangement of the elastic buffering member 44 in FIG. 17, this elastic buffering member 44' may have a higher manufacturing cost, but with a higher stiffness.

Figure 25:
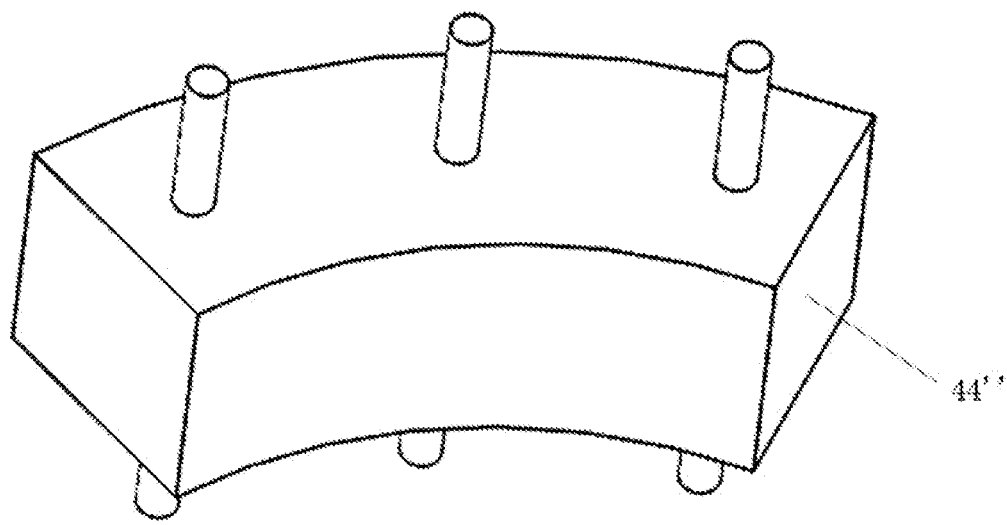
FIG. 25 shows the colliding mechanism in a further embodiment.

FIG. 25 shows an elastic buffering member 44" according to another embodiment. The elastic buffering member 44" is configured as a part of a sector. A plurality of elastic buffering members 44" can form a whole ring, and be fixedly arranged between the mounting plate 42 and the colliding body 45.

Figure 19:
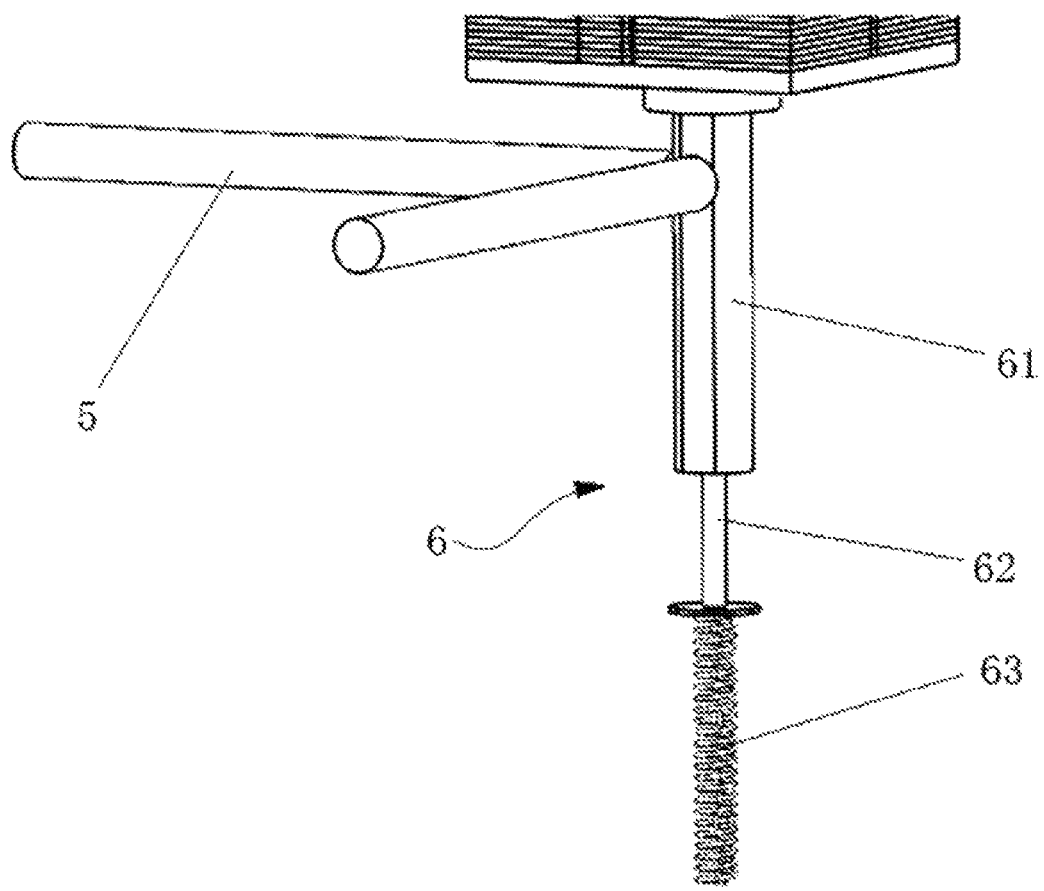
FIG. 19 shows a bottom spring assembly of the tunable mass damping device in an embodiment.

FIG. 19 shows the specific structure of the bottom spring assembly 6 of the device 100. The bottom spring assembly 6 includes a first link 61 fixedly connected with the tray 36 and extending downward therefrom, a second link 62 connected under the first link 61, and an elastic bottom member (spring) 63 connected between the second link 62 and a bottom wall 92 of the tower 9. The second link 62 is fixedly connected with the spring 63, and hinged with the first link 61. With this arrangement, when the weighted assembly 3 swings, the swinging frequency of the weighted assembly 3 can be adjusted to exactly match that of the tower 9.

Figure 20:
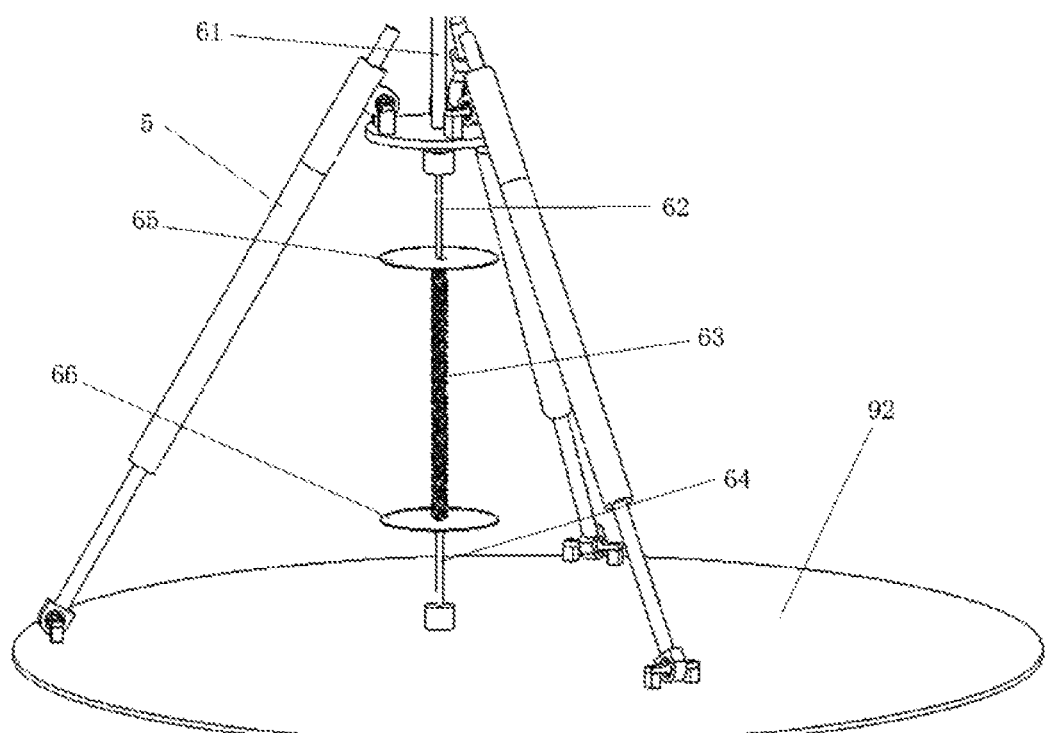
FIG. 20 shows the bottom spring assembly of the tunable mass damping device in another embodiment.

FIG. 20 shows another embodiment of the bottom spring assembly 6. The difference between the embodiment in FIG. 20 and that in FIG. 19 lies in that a third link 64 is connected between the spring 63 and the bottom wall 92 of the tower 9. One end of the third link 64 is fixedly connected to the spring 63, and the other end thereof is hinged to the bottom wall 92. Accordingly, the spring 63 can be deformed substantially only in the axial direction thereof. This is beneficial to improve the working efficiency of the spring 63, and prolong the service life thereof.

In addition, a first mounting disc 65 may be provided at a lower end of the second link 62, and a second mounting disc 66 may be provided at an upper end of the third link 64. The spring 63 is connected between the first mounting disc 65 and the second mounting disc 66. This arrangement allows a plurality of springs 63 parallel to each other to be provided between the first mounting disc 65 and the second mounting disc 66 to constitute a set of springs. The set of springs can provide high axial deformation stiffness.

In addition, a damper 5 extending in the lateral direction can further be arranged between the first link 61 and a side wall of the tower 9, and both ends of the damper 5 are hinged to the first link 61 and the tower 9, respectively. In the embodiment as shown in FIG. 19, the damper 5 extends substantially in the horizontal direction to attach to the side wall of the tower 9. In the embodiment as shown in FIG. 20, the damper 5 extends obliquely to attach to the bottom wall 92 of the tower 9.

In addition, in the embodiment as shown in FIG. 19, the damper 5 is directly connected to the first link 61. In the embodiment as shown in FIG. 20, a laterally extending plate is arranged on the first link 61, so that the damper 5 is connected to the first link 61 by being hinged to the laterally extending plate.

Preferably, a plurality of dampers 5 may be provided. For example, in FIG. 19 two dampers 5 are provided. Said two dampers 5 extend along two lateral directions that are perpendicular to each other. With this arrangement, it is more beneficial to adjust the relative swing relationship between the device 100 and the tower 9. In addition, as shown in FIG. 20, three dampers 5 may be provided. Said three dampers 5 are arranged 120 degrees apart from each other. The arrangement in which three dampers are arranged obliquely in FIG. 20 is further conducive to adjusting the swing frequency of the weighted assembly 3.

Although the present invention has been described in detail with reference to preferred embodiments, various improvements can be made to the present invention and components can be replaced with equivalents, without deviating the scope of the present invention. In particular, as long as no structural conflict exists, various technical features as mentioned in different embodiments can be combined in any arbitrary manner. The present invention is not limited to the specific embodiments disclosed herein, but contains all the technical solutions falling within the scope of the claims.

The invention claimed is:
1. A tunable mass damping device, comprising:
a connecting rod extending in a longitudinal direction;

a weighted assembly connected at a lower end of the connecting rod; and a top connecting assembly, which is connected between an upper end of the connecting rod and a tower beam of a tower, and includes an anti-rotation mechanism, the anti-rotation mechanism comprising:

a laterally extending fixing plate, which is fixedly connected to the tower beam through a longitudinally extending support member;

a laterally extending first movable plate, which is arranged under the fixing plate and fixedly connected with the upper end of the connecting rod; and two connecting shafts spaced apart from each other, wherein each of said connecting shafts extends in the longitudinal direction, and has a lower end fixedly connected to the first movable plate, and an upper end inserted into the fixing plate and connected therewith through a connecting head, wherein the connecting head includes an outer sleeve connected to the fixing plate, an inner sleeve arranged in the outer sleeve and connected to a respective one of the connecting shafts, and an intermediate elastic layer arranged between the inner sleeve and the outer sleeve.

2. The tunable mass damping device according to claim 1, wherein an inner side surface of the outer sleeve and/or an outer side surface of the inner sleeve is configured as an arched surface, which has a central part protruding outward in a radial direction.

3. The tunable mass damping device according to claim 1, wherein the top connecting assembly further comprises an outer mounting sleeve, through which the connecting head is connected with the fixing plate, wherein the outer mounting sleeve is configured to arrange around the outer sleeve and pressing inward thereon, so as to pre-compress the intermediate elastic layer of the connecting head, and/or the top connecting assembly further comprises an inner mounting sleeve, through which the connecting head is connected with a respective one of the connecting shafts, wherein the inner mounting sleeve is configured to arrange within the inner sleeve and press outward thereon, so as to pre-compress the intermediate elastic layer of the connecting head.

4. The tunable mass damping device according to claim 1, wherein the lower end of each connecting shaft is configured as an expansion cone, which is inserted into the first movable plate from a first side of the first movable plate and fixedly connected therewith through a first screw located at a second side of the first movable plate, wherein a pressing plate configured to cover the expansion cone is fixedly connected on the first side of the first movable plate.

5. The tunable mass damping device according to claim 1, wherein a gap is formed between the connecting shaft and the inner sleeve of the connecting head, or a linear bearing or a wear-resistant material body is provided so that the connecting shaft is slidable in an axial direction relative to the inner sleeve of the connecting head.

6. The tunable mass damping device according to claim 1, wherein the top connecting assembly comprises a longitudinal bearing mechanism, comprising:

a fixed connecting unit, which includes the fixing plate and a lower ball seat arranged on the fixing plate, the lower ball seat being configured with a convexly arcuate fixed mating surface facing upward;

a movable connecting unit, which includes a second movable plate arranged above the fixed connecting unit and spaced therefrom, and an upper ball seat arranged below the second movable plate, the upper ball seat being configured with a concavely arcuate movable mating surface facing downward, and the second movable plate being fixedly connected to the first movable plate through a longitudinally extending auxiliary connecting element; and an elastic connecting member, which is arranged between the fixed mating surface and the movable mating surface and has a shape matching with the fixed mating surface and the movable mating surface.

7. The tunable mass damping device according to claim 6, wherein the arcuate fixed mating surface has a planar portion extending in a lateral direction at a central part thereof, and/or the arcuate movable mating surface has a planar portion extending in the lateral direction at a central part thereof.

8. The tunable mass damping device according to claim 6, wherein a second concave portion is provided at an edge of the elastic connecting member and configured to be able to at least partially close up when being loaded in the longitudinal direction.

9. The tunable mass damping device according to claim 6, wherein a metal spacing plate is embedded in the elastic connecting member, wherein the metal spacing plate extends throughout the elastic connecting member or is only arranged at an edge of the elastic connecting member but not extending to a center of the elastic connecting member.

10. The tunable mass damping device according to claim 1, wherein the top connecting assembly comprises a longitudinal bearing mechanism, comprising:

a fixed connecting unit, which includes the fixing plate and a bearing seat arranged on the fixing plate, the bearing seat being configured with a concavely arcuate first bearing engagement surface facing upward; and a movable connecting unit, which includes a second movable plate arranged above the fixed connecting unit, and a bearing slider arranged below the second movable plate, the bearing slider being configured with a convexly arcuate second bearing engagement surface facing downward, wherein the second bearing engagement surface and the first bearing engagement surface are in contact with each other, so that the bearing slider is slidable along the first bearing engagement surface of the bearing seat.

11. The tunable mass damping device according to claim 10, wherein one or more wear-resistant sheets are provided on the first bearing engagement surface.

12. The tunable mass damping device according to claim 10, wherein the bearing slider is further configured with a concavely arcuate third bearing engagement surface facing upward, wherein the longitudinal bearing mechanism further includes a limiting plate arranged on the bearing slider, the limiting plate being configured with a convexly arcuate fourth bearing engagement surface facing downward, which is in contact with the third bearing engagement surface, so that the bearing slider is slidable along the fourth bearing engagement surface of the limiting plate; and wherein each of the first bearing engagement surface and the bearing slider is configured as having an annular shape, and the bearing seat is further provided with a connecting protrusion, which extends upward from a middle part of the annular first bearing engagement surface and passes through the bearing slider to fixedly connect with the limiting plate, wherein an inner diameter of the annular bearing slider is larger than an outer diameter of the connecting protrusion, and a sliding range of the bearing slider is restricted by the inner diameter of the bearing slider and the outer diameter of the connecting protrusion.

13. The tunable mass damping device of claim 10, wherein the bearing seat is provided with lubricant passages extending from an outer surface of the bearing seat to the first bearing engagement surface, for supplying lubricant to the first bearing engagement surface and the second bearing engagement surface.

14. The tunable mass damping device according to claim 1, wherein the connecting rod comprises:
- a connecting core shaft, which is connected between the top connecting assembly and the weighted assembly, and configured to be elongated for reducing its weight; and
- an outer casing, which extends in the longitudinal direction to be sandwiched between the top connecting assembly and the weighted assembly and encloses the connecting core shaft.

15. The tunable mass damping device according to claim 1, wherein the weighted assembly comprises at least two weighting units spaced apart from each other in the longitudinal direction, and a colliding mechanism provided between two adjacent ones of said at least two weighting units, the colliding mechanism being configured to correspond to a colliding counterpart arranged in the tower so that they are able to collide with each other, said at least two weighting units being configured to adjust a center of gravity of the tunable mass damping device to the colliding mechanism, and the colliding mechanism comprises:
- a colliding body arranged in the colliding counterpart, which is annular; and
- an elastic buffering member, which is connected between the colliding body and a respective weighting unit located above the colliding body and configured as an elastic column extending in the longitudinal direction.

16. The tunable mass damping device according to claim 15, wherein an elastic pad is provided between the colliding body and the colliding counterpart and made of metal or polymer material softer than the colliding body.

17. The tunable mass damping device according to claim 15, wherein each weighting unit comprises a tray extending in a lateral direction, and one or more weighting plates arranged on the tray in a stack.

18. The tunable mass damping device according to claim 1, wherein the tunable mass damping device further comprises a bottom spring assembly arranged under the weighted assembly, the bottom spring assembly including a bottom elastic member extending in the longitudinal direction and connected between a bottom wall of the tower and the weighted assembly.

19. The tunable mass damping device according to claim 18, wherein the bottom spring assembly further comprises:
- a first link extending downward in the longitudinal direction from the weighted assembly; and
- a second link extending in the longitudinal direction, wherein an upper end of the second link is hinged with the first link, and a lower end thereof is connected with the bottom elastic member.

20. The tunable mass damping device according to claim 19, wherein the bottom spring assembly further comprises a third link connected between the bottom elastic member and the bottom wall of the tower, the third link being hinged with the bottom wall of the tower.

* * * * *